US010210629B2

(12) United States Patent
Ohba et al.

(10) Patent No.: US 10,210,629 B2
(45) Date of Patent: Feb. 19, 2019

(54) INFORMATION PROCESSOR AND INFORMATION PROCESSING METHOD

(71) Applicant: Sony Interactive Entertainment Inc., Tokyo (JP)

(72) Inventors: Akio Ohba, Kanagawa (JP); Hiroyuki Segawa, Kanagawa (JP); Tetsugo Inada, Kanagawa (JP); Hidehiko Ogasawara, Tokyo (JP); Hirofumi Okamoto, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 187 days.

(21) Appl. No.: 15/115,521

(22) PCT Filed: Dec. 1, 2014

(86) PCT No.: PCT/JP2014/081694
§ 371 (c)(1),
(2) Date: Jul. 29, 2016

(87) PCT Pub. No.: WO2015/122079
PCT Pub. Date: Aug. 20, 2015

(65) Prior Publication Data
US 2017/0011519 A1  Jan. 12, 2017

(30) Foreign Application Priority Data

Feb. 14, 2014  (JP) ................. 2014-026769
Feb. 14, 2014  (JP) ................. 2014-026770

(51) Int. Cl.
G06K 9/00 (2006.01)
G06T 7/73 (2017.01)
(Continued)

(52) U.S. Cl.
CPC .............. *G06T 7/73* (2017.01); *G06F 3/0346* (2013.01); *G06K 9/00375* (2013.01);
(Continued)

(58) Field of Classification Search
CPC ...... G06F 3/017; G06F 3/0425; G06F 3/0346; G06T 2207/10021; G06T 2207/10028;
(Continued)

(56) References Cited

U.S. PATENT DOCUMENTS 6,487,303 B1 * 11/2002 Yamaguchi ............... G06T 7/74
382/103
8,615,108 B1 * 12/2013 Stoppa ................. G06K 9/4671
382/103

(Continued)

FOREIGN PATENT DOCUMENTS

JP      10143659 A    5/1998
JP    2008146106 A    6/2008

(Continued)

OTHER PUBLICATIONS

Xavier et al (Real-time head and hand tracking based on 2.5D data, IEEE Transaction on multimedia, vol. 14, No. 3, Jun. 2012).*

(Continued)

*Primary Examiner* — Amara Abdi
(74) *Attorney, Agent, or Firm* — Matthew B. Dernier, Esq.

(57) ABSTRACT

A detection area is set in a three-dimensional space in which a subject exists. When an actual hand enters the detection area, coordinate points (white and black dots) represented by pixels making up a silhouette of the hand in a depth image enter the detection area. In the detection area, a reference vector is set that shows the direction which the hand should face relative to the shoulder as a reference point. Then, an inner product between two vectors, a vector from the ref- (Continued)

erence point to each of coordinate points and the reference vector, is calculated, followed by comparison between the inner products. Positions of coordinate points whose inner products are ranked high are acquired as the position of tips of the hand.

10 Claims, 21 Drawing Sheets

(51) Int. Cl.
*G06F 3/0346* (2013.01)
*G06K 9/32* (2006.01)
*G06K 9/62* (2006.01)

(52) U.S. Cl.
CPC ......... *G06K 9/3233* (2013.01); *G06K 9/6202* (2013.01); *G06T 2207/10021* (2013.01); *G06T 2207/10028* (2013.01); *G06T 2207/20021* (2013.01); *G06T 2207/30196* (2013.01)

(58) Field of Classification Search
CPC . G06T 2207/20021; G06T 2207/30196; G06T 7/73; G06K 9/00375; G06K 9/3233; G06K 9/6202
See application file for complete search history.

(56) References Cited

U.S. PATENT DOCUMENTS

| | | | | |
|---|---|---|---|---|
| 9,041,689 | B1* | 5/2015 | Zhou | G06F 3/0425 345/173 |
| 2004/0190776 | A1* | 9/2004 | Higaki | G06F 3/017 382/190 |
| 2011/0262002 | A1* | 10/2011 | Lee | G06F 3/017 382/103 |
| 2013/0036389 | A1* | 2/2013 | Ohira | G06F 3/005 715/863 |
| 2013/0236089 | A1* | 9/2013 | Litvak | G06K 9/00382 382/154 |
| 2014/0002604 | A1* | 1/2014 | Ohba | H04N 13/271 348/43 |
| 2014/0184745 | A1* | 7/2014 | Lv | G06F 3/005 348/46 |
| 2015/0022446 | A1* | 1/2015 | Asplund | G06F 3/014 345/157 |
| 2015/0077520 | A1 | 3/2015 | Ohba | |
| 2015/0199018 | A1* | 7/2015 | Kim | G06F 3/017 345/156 |
| 2015/0370321 | A1 | 12/2015 | Lundberg | |

FOREIGN PATENT DOCUMENTS

| | | | |
|---|---|---|---|
| JP | 2011022927 A | 2/2011 | |
| JP | 2012-120647 | * 6/2012 | ............ A16B 5/107 |
| JP | 2012120647 A | 6/2012 | |
| JP | 2012216946 A | 11/2012 | |
| JP | 2013037467 A | 2/2013 | |
| JP | 2013242812 A | 5/2013 | |
| WO | 2007050885 A1 | 5/2007 | |
| WO | 2014128789 A1 | 8/2014 | |

OTHER PUBLICATIONS

Jesus Suarez et al (hand gesture recognition with depth images, pp. 411-417, IEEE, 2012).*
Xavier et al (Real-time head and hand tracking based on 2.5D data, IEEE Transaction on multimedia, vol. 14, No. 3, Jun. 2012) (Year: 2012).*
Jesus Suarez et al (hand gesture recognition with depth images: A review, pp. 411-417, IEEE, 2012) (Year: 2012).*
International Preliminary Report on Patent Ability and Written Opinion for corresponding PCT Application No. PCT/JP2014/081694, 13 pages, dated Aug. 25, 2016.
International Search Report for corresponding PCT Application No. PCT/JP2014/081694, 4 pages, dated Dec. 22, 2014.
Supplemental Partial European Search Report for corresponding EP Application No. 14882680, 18 pages, dated Sep. 1, 2017.
Xavier Suau et al: "Real-Time Head and Hand Tracking Based on 2.5D Data" , IEEE Transactions on Multimedia, IEEE Service Center, Piscataway, NJ, US, vol. 14, No. 3, pp. 575-585, (Jun. 1, 2012).
Jesus Suarez et al: "Hand gesture recognition with depth images: A review", RO-MAN, 2012 IEEE, IEEE, pp. 411-417, (Sep. 9, 2012).
Taehee Lee et al: "Handy AR: Markerless Inspection of Augmented Reality Objects Using Fingertip Tracking", Wearable Computers, 2007 11th IEEE International Symposium ON, IEEE, PI, 8 pages, (Oct. 1, 2007).
Zhichao Ye et al: "Finger-writing-in-the-air system using Kinect sensor", 2013 IEEE International Conference on Multimedia and Expo Workshops (ICMEW), IEEE, 4 pages (Jul. 15, 2013).
Extended European Search Report for corresponding EP Application No. 14882680, 14 pages, dated Dec. 20, 2017.

* cited by examiner

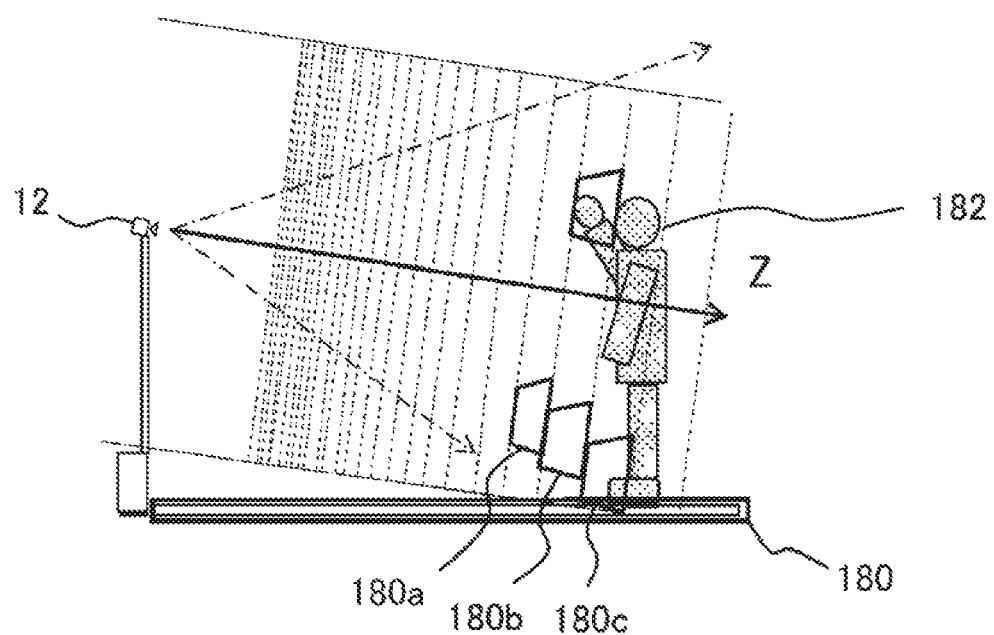
F I G . 2 2

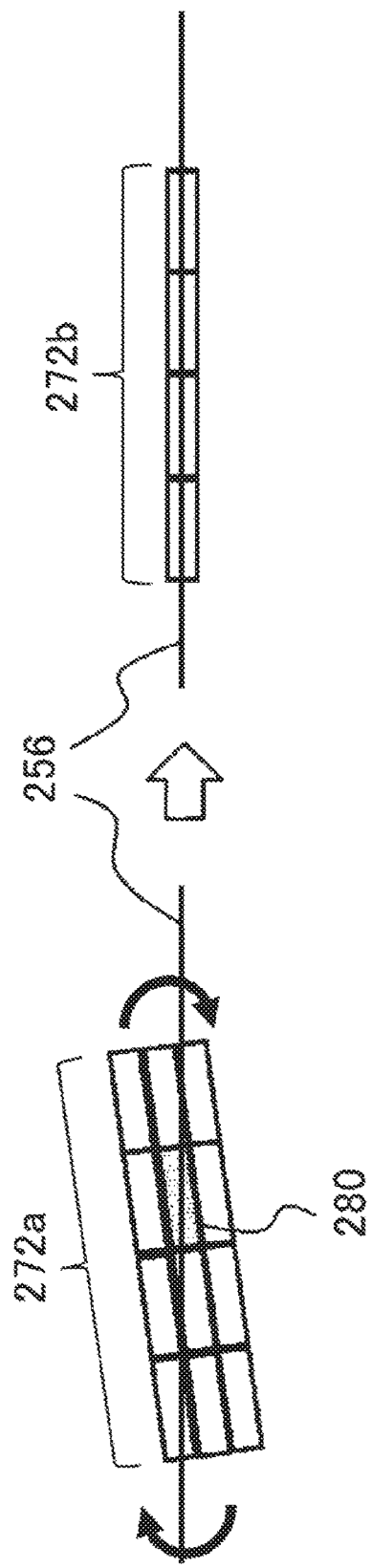

INFORMATION PROCESSOR AND INFORMATION PROCESSING METHOD

TECHNICAL FIELD

The present invention relates to an information processor that performs processes based on a shot image and an information processing method used by the information processor.

BACKGROUND ART

In recent years, it has become common practice that a camera is incorporated in a personal computer or game console for capturing images of a user for use in a variety of forms. For example, some technologies that are commercially available today such as television telephone and video chat are designed to transmit user's images to other end in an as-is manner via a network. Other technologies recognize user's motions by image analysis and use such motions as input information for games and information processing (refer, for example, to PTL 1). Further, it has become possible in recent years to provide a game which is better sense of realism and image representation by detecting object's motions in a three-dimensional space including the depth direction with high accuracy.

CITATION LIST

Patent Literature

[PTL 1] WO 2007/050885 A2 Publication

SUMMARY

Technical Problem

There are a variety of problems in shooting a space in which numerous objects exist and identifying only a desired target from an image thereof or tracking its motion. For example, there is a likelihood that processing results may be affected by the change in shooting environment such as light source. The detection process of a target at higher temporal and spatial resolutions for higher accuracy leads to higher processing load. As a result, it takes time from the shooting of a subject to the output of processing result, resulting in poor response to the subject's motion.

The present invention has been devised in light of the foregoing, and it is an object of the present invention to provide a technology for efficient and high accuracy position detection of a target in a three-dimensional space.

Solution to Problem

One mode of the present invention relates to an information processor. The information processor detects a position of a given target of a subject in a three-dimensional space shot with a camera and includes a depth image acquisition portion and a coordinate point analysis portion. The depth image acquisition portion acquires a depth image representing, on an image plane, a distance of the subject from the camera in a depth direction as a pixel value. The coordinate point analysis portion identifies a tip position of the target and generates and outputs position information thereof by performing a given calculation on each of coordinate points included in a detection area set in the three-dimensional space and comparing these coordinate points if a given number or more of coordinate points representing pixels of the depth image in the three-dimensional space are included in the detection area.

Another mode of the present invention relates to an information processing method for an information processor to detect a position of a given target of a subject in a three-dimensional space shot with a camera. The information processing method includes a step of acquiring a depth image representing, on an image plane, a distance of the subject from the camera in a depth direction as a pixel value and storing the depth image in a memory. The information processing method further includes a step of identifying a tip position of the target and generating and outputting position information thereof by performing a given calculation on each of coordinate points included in a detection area set in the three-dimensional space and comparing these coordinate points if a given number or more of coordinate points representing pixels of the depth image read from the memory are included in the detection area.

Still another mode of the present invention relates to an information processor. The information processor detects a position of a given target of a subject in a three-dimensional space shot with a camera and includes a depth image acquisition portion and a coordinate point analysis portion. The depth image acquisition portion acquires a depth image representing, on an image plane, a distance of the subject from the camera in a depth direction as a pixel value. The coordinate point analysis portion identifies a position of the target and generates and outputs position information thereof by setting a detection area and a dead area in the three-dimensional space and detecting coordinate points representing pixels of the depth image in the three-dimensional space that lie within the detection area and outside the dead area. The detection area is used to detect the presence of the target by judging whether the coordinate points lie within or outside the detection area. The dead area defines bounds within which the coordinate points are not subject to the judgment.

Still another mode of the present invention relates to an information processing method for an information processor to detect a position of a given target of a subject in a three-dimensional space shot with a camera. The information processing method includes a step of acquiring a depth image representing, on an image plane, a distance of the subject from the camera in a depth direction as a pixel value and storing the depth image in a memory. The information processing method further includes a step of identifying a position of the target and generating and outputting position information thereof by setting a detection area and a dead area in the three-dimensional space and detecting coordinate points representing pixels of the depth image read from the memory in the three-dimensional space that lie within the detection area and outside the dead area. The detection area is used to detect the presence of the target by judging whether the coordinate points lie within or outside the detection area. The dead area defines bounds within which the coordinate points are not subject to the judgement.

It should be noted that any combinations of the above components and any conversions of expressions of the present invention between method, device, system, computer program, recording medium storing a computer program, and so on are also effective as modes of the present invention.

Advantageous Effect of Invention

The present invention achieves high accuracy and excellent response in information processing using a shot image as input information.

BRIEF DESCRIPTION OF DRAWINGS

FIG. 22 is a diagram schematically illustrating an example in which a dead area is set for a floor in the present embodiment.

FIG. 24 is a diagram for describing a technique for adjusting an angle of a detection area to properly detect a horizontal plane.

DESCRIPTION OF EMBODIMENT

Figure 1:
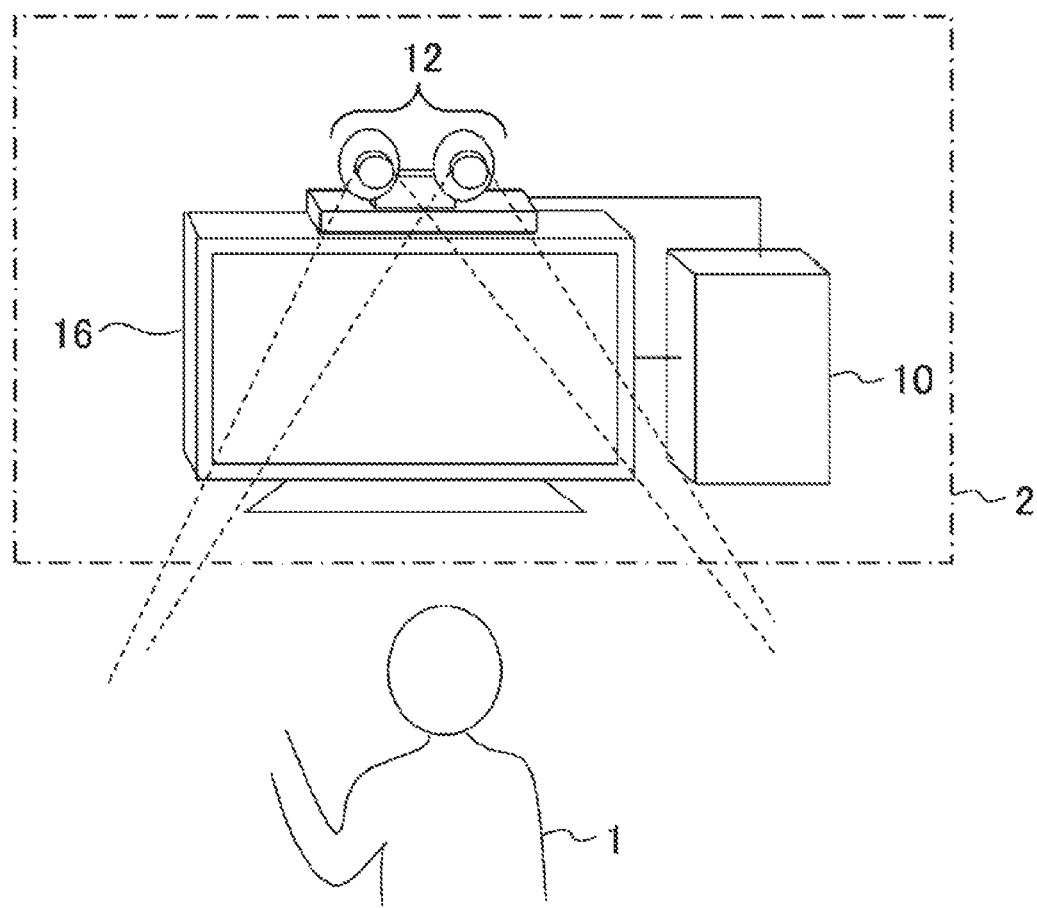
FIG. 1 is a diagram illustrating a configuration example of an information processing system to which the present embodiment is applicable.

FIG. 1 illustrates a configuration example of an information processing system to which the present embodiment is applicable. An information processing system 2 includes an imaging device 12, an information processor 10, and a display device 16. The imaging device 12 includes two cameras adapted to capture a target such as a user 1. The information processor 10 handles information processing in response to a request of the user on the basis of the shot image. The display device 16 outputs image data obtained as a result of the processes performed by the information processor 10. The information processor 10 may connect to a network such as the Internet.

The information processor 10, the imaging device 12, and the display device 16 may be connected together by cables. Alternatively, they may be connected together wirelessly, for example, through wireless local area network (LAN). Any two of the imaging device 12, the information processor 10, and the display device 16, or all thereof may be combined integrally. Alternatively, the imaging device 12 need not necessarily be disposed on top of the display device 16. Further, there are no limitations to the number and types of subjects.

The imaging device 12 has two digital video cameras that are arranged, one on the left and another on the right with a known space therebetween. Each of the digital video cameras includes a charge coupled device (CCD), complementary metal oxide semiconductor (CMOS), or other imaging element. Each of the digital video cameras captures a subject existing in the same space from the right or left position at a given frame rate. A frame pair obtained by shooting as described above will be hereinafter referred to as "stereo images."

The information processor 10 detects a position of a subject in a three-dimensional space including an image plane and a depth direction from a camera. The detection result is used for processes performed at subsequent stages where a subject's position and motion are used as input information. For example, the detection result is used to achieve augmented reality (AR) that draws, on a shot image, virtual objects that react to hand and foot motions of the user 1, a subject. Alternatively, the motion of the user 1 may be tracked to be reflected into a game image or convert it into a command input for information processing. Thus, the application purpose of information related to subject position obtained in the present embodiment is not specifically limited.

The display device 16 displays the result of the process performed by the information processor 10 as an image as necessary. The display device 16 may be a display adapted to output an image or a television set having a speaker adapted to output sounds. The display device 16 may be, for example, a liquid crystal television, plasma television, personal computer (PC) display, and so on. The details of processes eventually performed by the information processor 10 and the image to be displayed are not specifically limited by the application purpose thereof as described above. Therefore, a description will be given below with primary emphasis on position detection process of a subject handled by the information processor 10.

Figure 2:
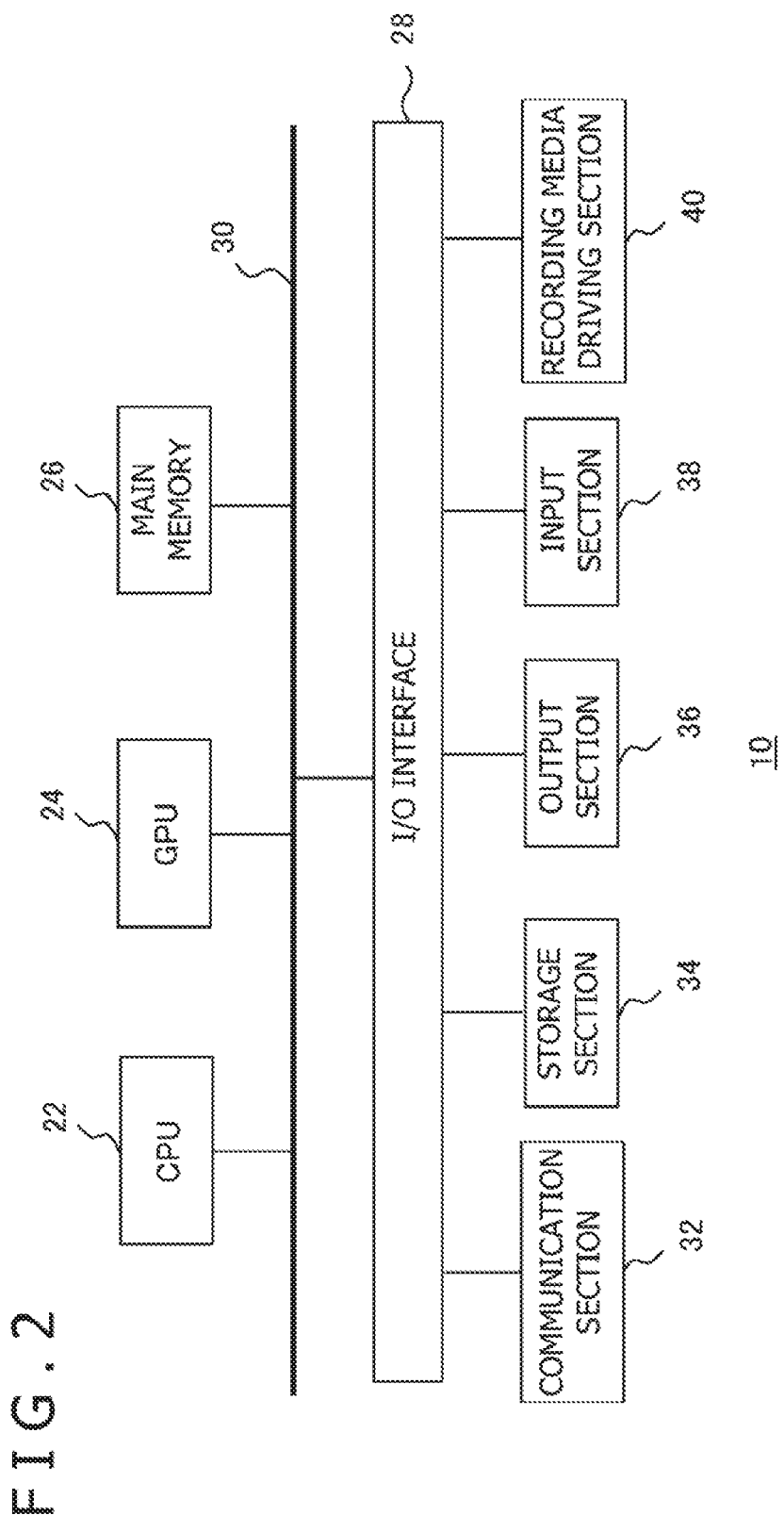
FIG. 2 is a diagram illustrating an internal circuit configuration of an information processor in the present embodiment.

FIG. 2 illustrates an internal circuit configuration of the information processor 10. The information processor 10 includes a central processing unit (CPU) 22, a graphics processing unit (GPU) 24, and a main memory 26. The CPU 22 performs processes associated with the internal components of the information processor 10 and controls the exchange of signals on the basis of programs such as the operating system and application programs. The GPU 24 handles image processing. The main memory 26 includes a random access memory (RAM) and stores programs and data required for processing.

These sections are connected to each other via a bus 30. An input/output (I/O) interface 28 is also connected to the bus 30. A communication section 32, a storage section 34, an output section 36, an input section 38, and a recording media driving section 40 are connected to the I/O interface 28. The communication section 32 includes a peripheral interface such as universal serial bus (USB) and IEEE1394 and wired or wireless LAN network interface. The storage section 34 includes a hard disk drive, a nonvolatile memory, and so on. The output section 36 outputs data to output devices such as the display device 16 and the speaker. The input section 38 receives data inputs from input devices such as keyboard, mouse, the imaging device 12, and microphone. The recording media driving section 40 drives a removable recording media such as magnetic disk, optical disk, or semiconductor memory.

The CPU 22 controls whole of the information processor 10 by executing the operating system stored in the storage section 34. The CPU 22 also executes various programs that are either read from the removable recording media and loaded into the main memory 26 or downloaded via the communication section 32. The GPU 24 has a geometry engine function and a rendering processor function, performing drawing in accordance with a drawing instruction from the CPU 22, and storing a display image in a frame buffer which is not depicted. Then, the display image stored in the frame buffer is converted into a video signal and output, for example, to the output section 36.

Figure 3:
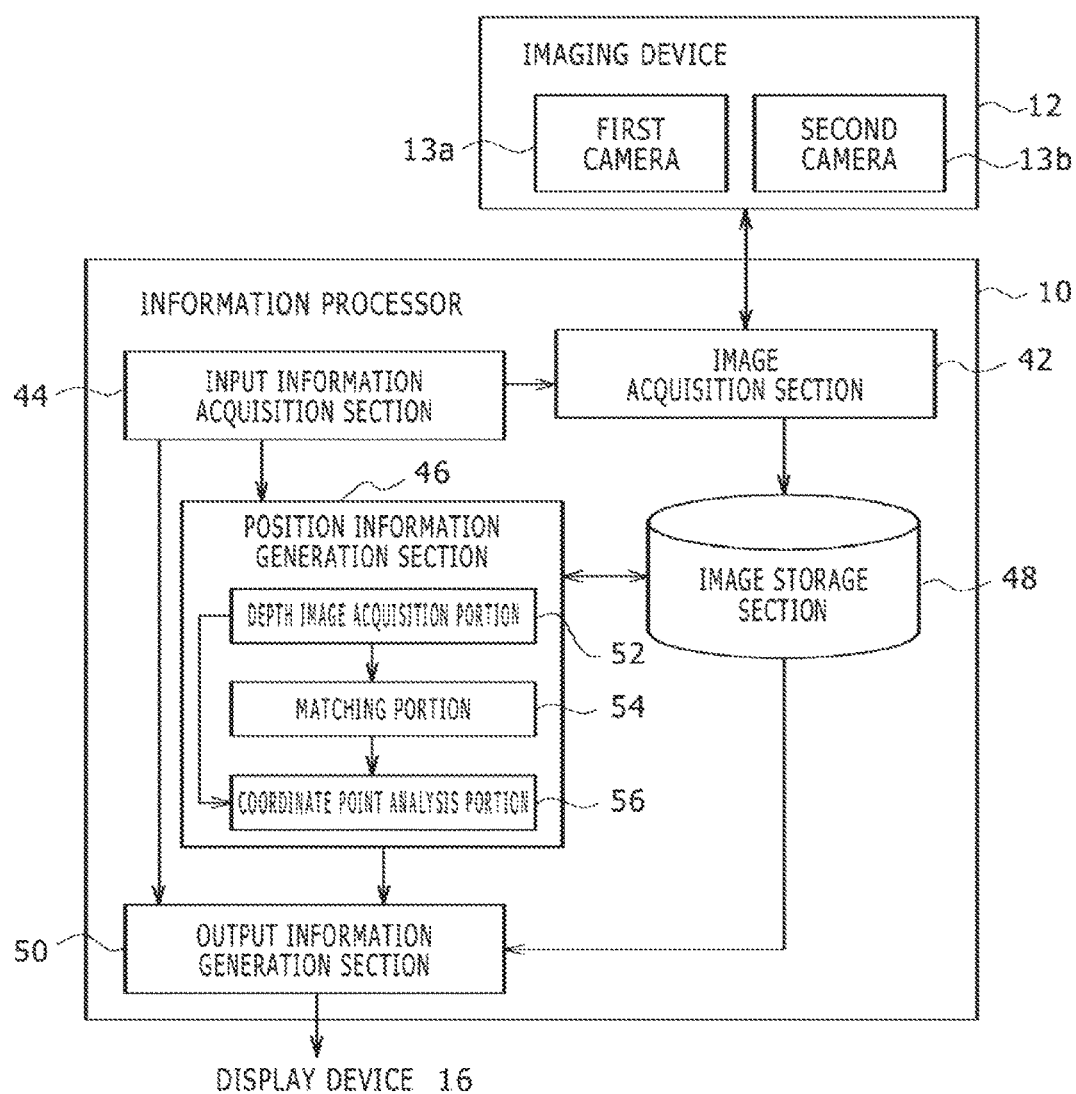
FIG. 3 is a diagram illustrating configurations of an imaging device and the information processor in the present embodiment.

FIG. 3 illustrates configurations of the imaging device 12 and the information processor 10. Each of the functional blocks illustrated in FIG. 3 can be implemented in terms of hardware by the CPU, the GPU, the RAM illustrated in FIG. 2, and other processors and in terms of software by programs offering data input, data retention, image analysis, drawing and other functions. Therefore, it will be understood by those skilled in the art that these functional blocks can be implemented in various forms including hardware alone, software alone, and a combination thereof, and are not limited to any one of them.

The imaging device 12 includes first and second cameras 13a and 13b. Each of the cameras captures a subject from the left or right position at a given frame rate. The left and right positions are spaced by a known width. The stereo images obtained by shooting are transmitted to the information processor 10 whenever necessary by an ordinary technique in response to a request from the information processor 10. The information processor 10 includes an image acquisition section 42, an input information acquisition section 44, a position information generation section 46, an output information generation section 50, and an image storage section 48. The image acquisition section 42 acquires stereo images from the imaging device 12. The input information acquisition section 44 acquires an instruction input from the user. The position information generation section 46 generates target position information on the basis of shot images. The output information generation section 50 generates output information by performing necessary processes on the basis of the target position. The image storage section 48 stores stereo images supplied from the imaging device 12 and a depth image data acquired by the position information generation section 46.

The input information acquisition section 44 accepts an instruction input to start or terminate the process and an instruction input from the user by the means except shooting of the imaging device 12 and transmits an appropriate processing request signal to other functional blocks. The input information acquisition section 44 is implemented by coordination between an ordinary input device such as button, keyboard, mouse, trackball, or touch panel and the CPU adapted to interpret the details of operation performed on the input device and generate a processing request signal.

The image acquisition section 42 acquires image data such as stereo images from the imaging device 12 in response to a request from the input information acquisition section 44, storing the image data in the image storage section 48. Images to be acquired by the image acquisition section 42 may be various in type in accordance with the process performed by the output information generation section 50 at a subsequent stage or information to be output. For example, only an image shot with the first camera 13a may be acquired at the same frame rate as at the time of shooting, and stereo images shot by the first and second cameras 13a and 13b at a lower rate, in other words, lower frequency may be acquired. That is, the frame rates at which an image shot by the first camera 13a and that shot by the second camera 13b are acquired may be specified independently of each other.

The position information generation section 46 detects the three-dimensional position of specific range of subjects on the basis of the stereo image data stored in the image storage section 48. The position information generation section 46 includes a depth image acquisition portion 52, a matching portion 54, and a coordinate point analysis portion 56. The depth image acquisition portion 52 generates a depth image representing a position distribution of subjects existing in the field of view of the imaging device 12 in the depth direction using stereo images. The position distribution of subjects in the depth direction can be found by an ordinary technology such as the stereo image method. Here, the stereo image method is an ordinary technique which associates feature points between stereo images to calculate the positions of the subjects in the depth direction from the parallax. On the other hand, the depth image is an image in which the distance of each subject in the depth direction from the imaging device 12 is mapped into two-dimensional coordinates of the image plane and represented as a pixel value.

Therefore, the depth image represents the positions of not only main subjects such as persons but also a variety of objects existing in the space to be shot such as chair and desk together with their shapes. It should be noted that the imaging device 12 may have a function to generate a depth image. In this case, the image acquisition section 42 acquires depth image data from the imaging device 12 and stores it in the image storage section 48, and then the depth image acquisition portion 52 reads the data. Alternatively, an infrared sensor and camera or a reference beam-illuminated camera may be provided separately to analyze an infrared beam irradiated onto the subjects, the reflection time of the reference beam, and the infrared image, thus acquiring a position distribution of the subjects in the depth direction and generating a depth image based on the position distribution. In any case, the depth image acquisition portion 52 supplies the generated or acquired depth image to the matching portion 54 and the coordinate point analysis portion 56. Alternatively, the depth image acquisition portion 52 stores the depth image in the image storage section 48 and notifies identification information thereof to the matching portion 54 and the coordinate point analysis portion 56.

The matching portion 54 and the coordinate point analysis portion 56 identify the positions of parts of the subjects in the three-dimensional space required for the subsequent processes using the depth image. For example, identifying the positions of moving parts such as head, hands, and feet at a given rate makes it possible to detect the user's motion, thus allowing the game to advance or achieving AR.

Characteristics such as shape change and motion range vary from one part to be detected to another. For example, the head does not change in shape to a large extent irrespective of the user's orientation or motion. The hands are highly likely to change in shape. However, the motion range thereof is limited relative to the shoulder positions estimated from the head. The motion range of feet is also limited relative to the torso position. The present embodiment takes advantage of different detection techniques at a plurality of stages in consideration of such characteristics of each part, thus ensuring efficiency and high accuracy. More specifically, the matching portion 54 detects a human head position by matching against a template image. For this reason, reference template image data for matching that represents the head shape and size is stored, for example, in a memory accessible by the matching portion 54.

The coordinate point analysis portion 56 estimates motion ranges of the hands and feet on the basis of the head position detected by the matching portion 54. Then, the coordinate point analysis portion 56 identifies hand and foot tip positions on the basis of coordinate points, represented by the depth image, in the detection area set in consideration of the motion range. Therefore, rules for setting a detection area including the shape and size thereof, a threshold set for the number of coordinate points used to judge the presence or absence of targets within the detection area, a reference vector that represents the direction which the hand tips or other parts should face in the detection area, and other information, are stored in a memory accessible by the coordinate point analysis portion 56.

It should be noted that the targets whose positions are to be detected by the matching portion 54 and the coordinate point analysis portion 56 are not limited to human heads, hands, and feet. Qualitatively, the matching portion 54 is suited for detection of objects that do not change in shape to a large extent, and the coordinate point analysis portion 56 is suited for detection of objects whose ranges and directions of motion are estimatable. On the other hand, although it is more efficient to detect the latter using a detection result of the former, the sequence of detection is not restricted. Only the former or latter may be detected according to target, environment or the like. Alternatively, both of them may be detected at different rates.

The output information generation section 50 performs further processes as appropriate according to the application purpose on the basis of information relating to the target position supplied from the position information generation section 46. Among such processes is drawing on the shot image read from the image storage section 48. The process performed here is not specifically limited as described above and may be changed as appropriate in response to an instruction from the user accepted by the input information acquisition section 44, programs to be performed, and so on. Image data obtained as a result of the process is output and displayed on the display device 16. Alternatively, image data may be transmitted to other device via a network. The output information generation section 50 further generates audio data according to the subject's motion, and outputs it from the speaker.

Figure 4:
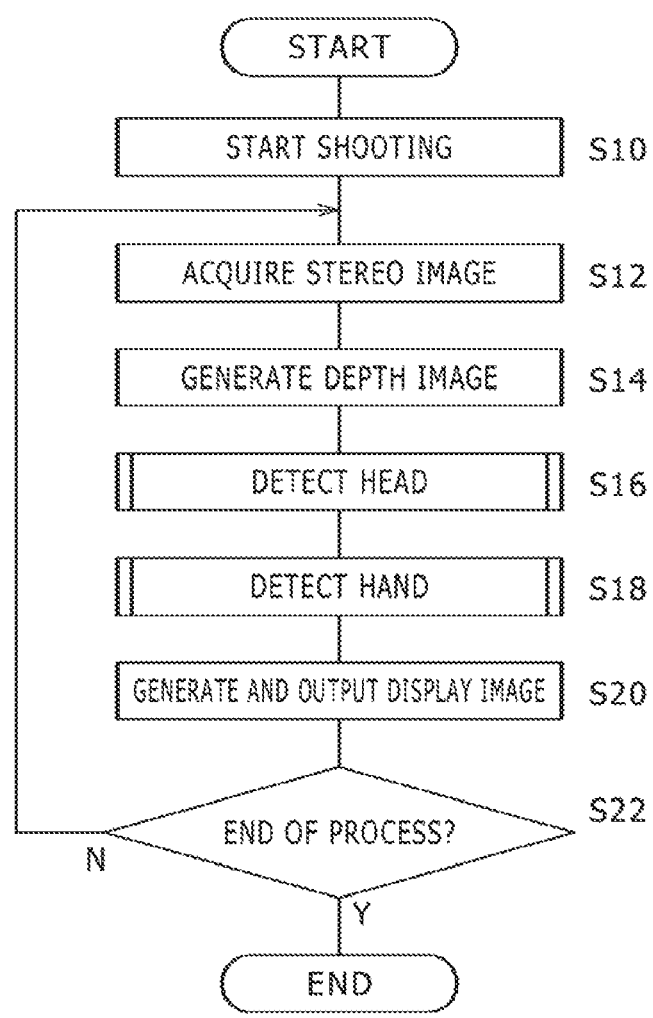
FIG. 4 is a flowchart depicting basic steps associated primarily with target position detection of all information processing tasks handled by the information processing system in the present embodiment.

A description will be given next of the operation of the information processor implemented by the configuration described above. FIG. 4 is a flowchart depicting basic steps associated primarily with target position detection of all information processing tasks handled by the information processing system 2. In this example, a subject is a person, and the head and hand positions of the person are detected at a given rate, thus reflecting the motions thereof into a display image. First, when the user instructs the input information acquisition section 44 to start the process, the imaging device 12 starts the shooting of the subject in response to a shooting start request via the image acquisition section 42 (S10). The image acquisition section 42 of the information processor 10 sequentially acquires frame data of the movie shot as described above and stores the data in the image storage section 48 (S12). This data includes stereo image data at a given rate.

Next, the depth image acquisition portion 52 of the position information generation section 46 generates a depth image using the stereo image data stored in the image storage section 48 (S14). The depth image has a distribution of subject distances in the depth direction as pixel values. If the imaging device 12 has a function to generate a depth image as described above, the depth image data is stored in the image storage section 48. Therefore, the depth image acquisition portion 52 reads the data rather than generating a depth image in S34. Next, the matching portion 54 of the position information generation section 46 matches the depth image against the template image representing a human head shape, thus detecting a silhouette of the subject's head, and by extension, a head position in the three-dimensional space (S16).

Next, the coordinate point analysis portion 56 of the position information generation section 46 determines a detection area on the basis of the motion range of hands that can be estimated on the basis of the head position, detecting the hand position based on the coordinate points of the depth image existing in the detection area (S18). More specifically, the presence of a hand is detected on the basis of the number of coordinate points in the detection area first. Further, the hand tip position is detected on the basis of a direction which the hand tip should face at that position. Relative to a shoulder or elbow, a hand moves on a spherical plane centered therearound within the motion range. As a result, the hand tip direction is represented approximately by a normal vector of a spherical plane.

For this reason, the direction which the hand tip should face is set as a reference vector for each detection area by taking advantage of such a characteristic. Then, these directions are compared against an actual distribution of coordinate points, thus determining the hand tip position. Here, the term "hand tip" refers to a tip portion of a hand irrespective of whether it is a fist or palm. When the hand tip position is discovered, the hand and arm positions, for example, can also be identified thanks to silhouette continuity in the shot or depth image. The foot tip can be detected by replacing the shoulders and elbows with the leg joints and knees. Further, the elbows and knees can be similarly detected relative to the shoulders and leg joints. The output information generation section 50 performs image processing and analysis appropriate to the application purpose on the basis of position information of the head and hand tip in the three-dimensional space, generating, as necessary, a display image representing the processing result and outputting the image (S20).

Steps S12 to S20 are repeated at a given rate until the termination of the process is instructed by the user, continuously outputting a movie or other image that reflects the target motion (N in S22) and terminating all the steps in response to an instruction to terminate the process (Y in S22). It should be noted that the display image output step in S20 may be performed at intervals separate from the position detection steps from S12 to S18. For example, a display image may be output at a rate similar to the movie frame rate, and the detection step performed at a lower rate shot by the imaging device 12. Alternatively, the head detection step in S16 and the hand detection step in S18 may be performed at different intervals.

Figure 5:
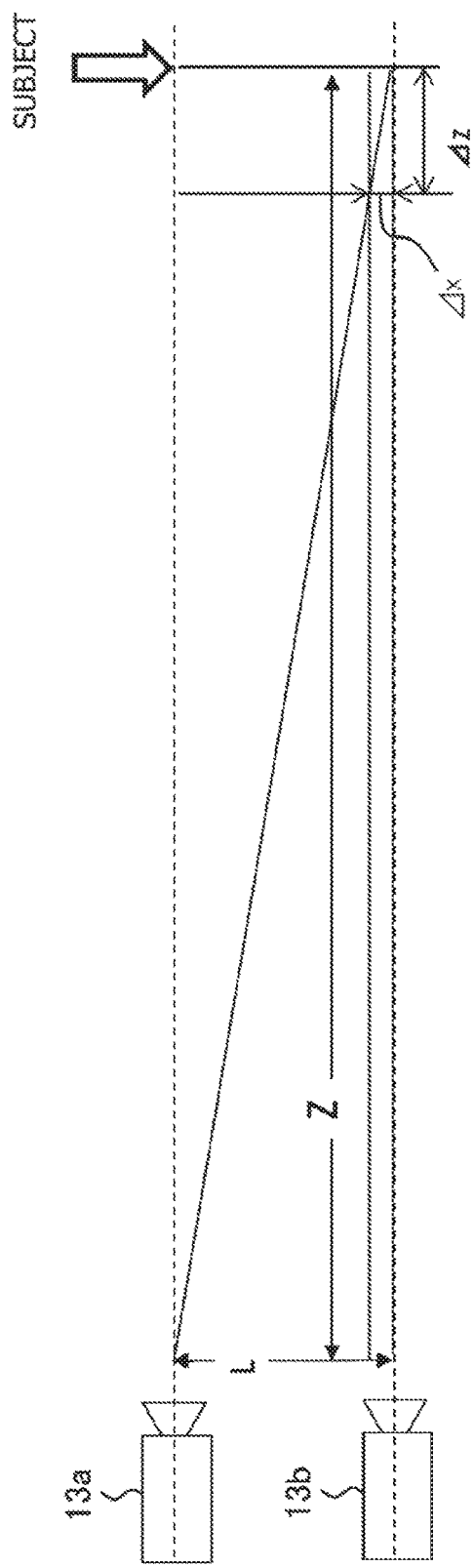
FIG. 5 is a diagram for describing a relationship between stereo image parallax and a position of a subject in a depth direction in the present embodiment.

A description will be given next of the head detection step in S16 performed by the matching portion 54 in the flowchart depicted in FIG. 4. This step is applicable not only to human heads but also to objects that do not change in shape to a large extent for position, orientation, or motion. A description will be given first of a relationship between a target position in the depth direction and a template image size. We assume here that the same unit of length such as meters is used unless otherwise specified. FIG. 5 is a diagram for describing a relationship between stereo image parallax and a position of a subject in the depth direction. The first and second cameras 13a and 13b are disposed in such a manner as to have parallel optical axes that are at a distance L from each other. We assume that the subject is located at the position indicated by the arrow at the far right end. This position is at a distance Z in the depth direction.

A width Δx in the real space represented by one pixel of the image shot by each of the cameras is proportional to the distance Z and expressed as follows:

$$\Delta x = Z \times w/W \tag{1}$$

where W is the horizontal pixel count of the camera, w is the horizontal range of view field of the real space when the distance Z is 1 and is determined by the view angle.

The same subject captured by the cameras that are at the distance L from each other has approximately the following parallax D in pixels (pixels) in that image:

$$D = L/\Delta x = L \times (W/w) \times (1/Z) = C/Z \tag{2}$$

where C is the value determined by the camera and its setting and can be considered a constant during operation. Assuming that parallax $D_{at1}$ (pixels) at the distance Z of 1 is known, the distance Z in the depth direction for the arbitrary parallax D (pixels) is found as follows:

$$Z = D_{at1}/D \tag{3}$$

On the other hand, assuming that the reference template image read by the matching portion 54 represents the target in a width $p_{tmp}$ (pixels) in pixels, a width p (pixels) of the target in pixels at the arbitrary distance Z is inversely proportional to the distance Z in the depth direction as is the parallax D (pixels) and expressed as follows:

$$p = p_{tmp} \times (Z_{tmp}/Z) \tag{4}$$

where $Z_{tmp}$ is the distance of a target in the depth direction when the target is represented in the size matching the reference template in the shot image.

Letting the width represented by one pixel of the reference template in the real space be denoted by $\Delta x_{tmp}$ and letting the width represented by one pixel of the image shot with a camera in the real space at the distance Z of 1 be denoted by $\Delta x_{at1}$, then the following holds from formula (1):

$$\Delta x_{tmp} = Z_{tmp} \times w/W \tag{5}$$

$$\Delta x_{at1} = w/W \tag{6}$$

Hence, the following formula is obtained:

$$Z_{tmp} = \Delta x_{tmp}/\Delta x_{at1} \tag{7}$$

Therefore, formula (4) changes to the following:

$$p = p_{tmp} \times \Delta x_{tmp}/\Delta x_{at1}/Z \tag{8}$$

As a result, a magnification factor M by which the reference template image should be multiplied to fit the reference template image to the size of the subject in the image at the arbitrary distance Z is found as follows:

$$M = \Delta x_{tmp}/\Delta x_{at1}/Z \tag{9}$$

$\Delta x_{at1}$ is a fixed value which depends, for example, on the camera. Therefore, the size can be adjusted by determining $\Delta x_{tmp}$ in accordance with the reference template image to be prepared. For example, if the position of a human head is identified, and if a reference template image is prepared which assumes the head to be 0.2 m wide or so and represents the actual width of 0.3 m including a margin area as 16 pixels in width, $\Delta x_{tmp}=0.3/16=0.019$ m. It should be noted that, in the present embodiment, matching process is performed between a depth image and a size-adjusted template image as described above. Therefore, if the image shot with a camera and the depth image differ in resolution, the width of the real space represented by one pixel of the depth image is assumed to be $\Delta x_{at1}$.

Figure 6:
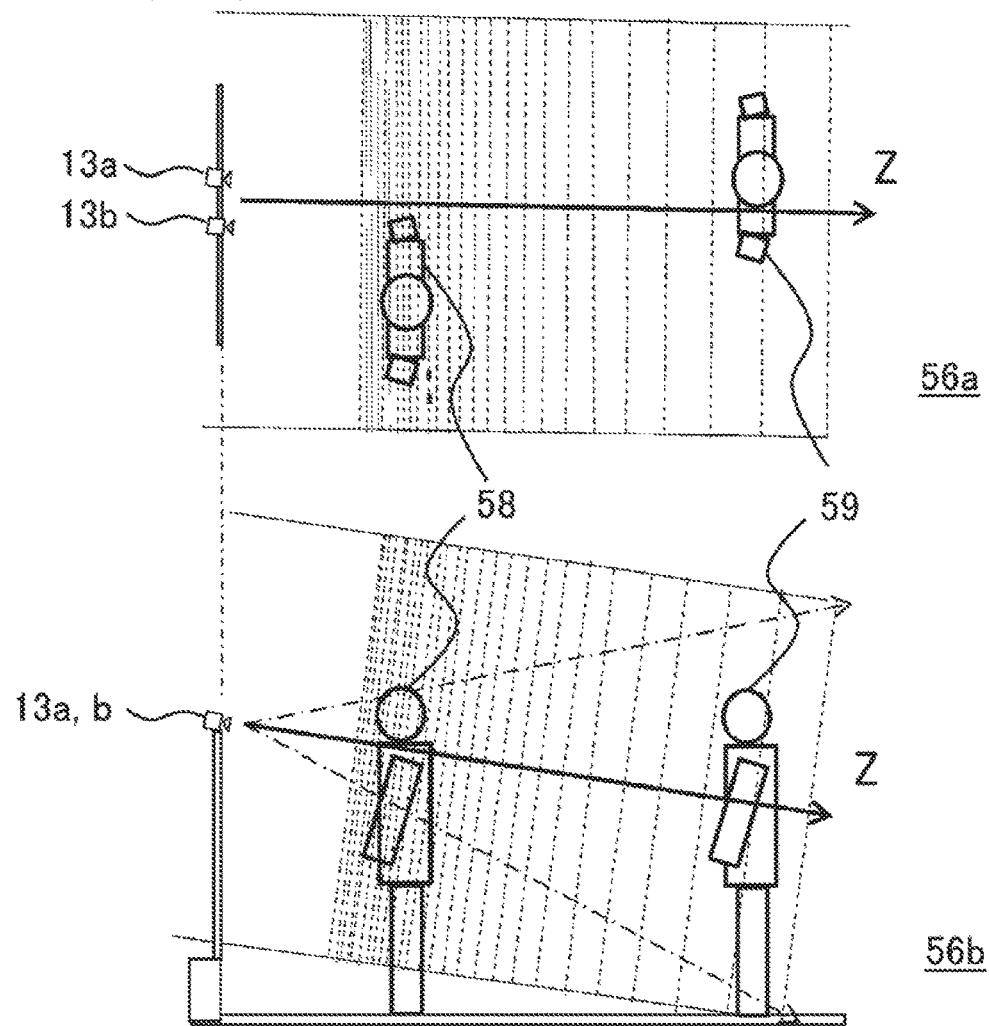
FIG. 6 is a diagram for describing axes in the depth direction in a shooting space in the present embodiment.

FIG. 6 is a diagram for describing axes in the depth direction in a shooting space. The figure at the top is a schematic diagram 56a as seen from top of the shooting space. The figure at the bottom is a schematic diagram 56b as seen from side of the shooting space. Persons 58 and 59, subjects, are in the fields of view of the first and second cameras 13a and 13b.

It should be noted that the optical axes of the first and second cameras 13a and 13b are parallel with no vertical displacement between them as depicted in FIG. 5. There is actually vertical displacement between them in some cases. However, we assume that an image shot in such an environment is corrected to a condition free from displacement by an ordinary technique. In FIG. 6, dotted lines represent equal parallax planes. Here, the term "equal parallax plane" refers to a plane on which the parallax is the same on all points of the plane, and by extension, to a plane on which the distance Z from the cameras is equally calculated by formula (2). Therefore, the distance Z in the depth direction is defined by the distance from the imaging planes (sensor planes) of the cameras on the axis (optical axes) vertical to the equal parallax planes as depicted in FIG. 6.

Figure 7:
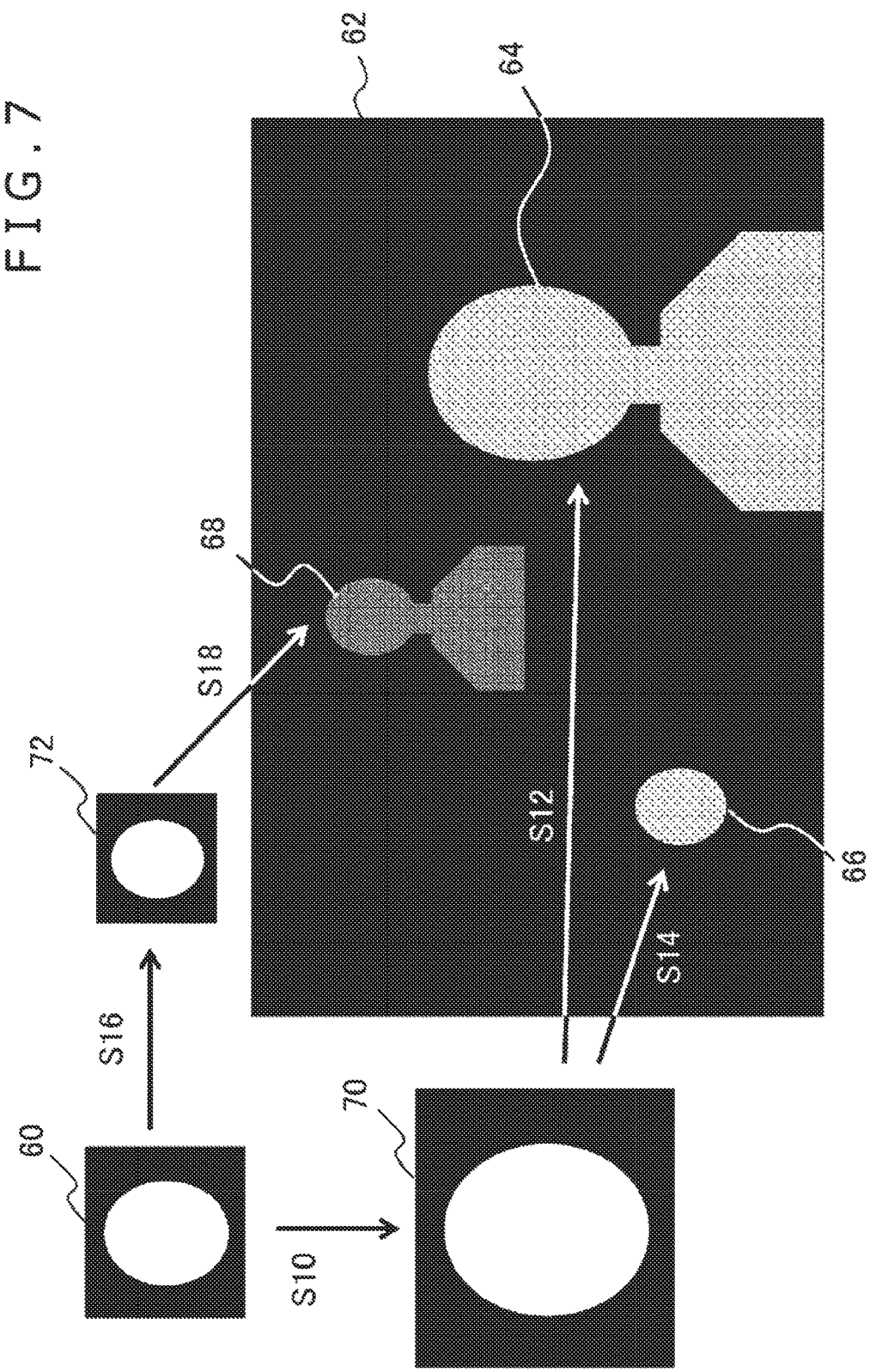
FIG. 7 is a diagram schematically illustrating steps of a template matching process handled by a matching portion in the present embodiment.

FIG. 7 schematically illustrates steps of a template matching process handled by the matching portion 54. First, a reference template image 60 is prepared in advance which defines the shape and size of the target as described earlier.

In the example depicted in FIG. 7, a human head is a target. Therefore, the reference template image 60 represents a vertically long ellipse. Further, the reference template image 60 is a binary image whose elliptical area representing the shape of the target is white (pixel value of 1), and whose area other than that is black (pixel value of 0). A description will be given hereinafter by adhering to this data format. However, the data format of a reference template image is not limited thereto.

On the other hand, the depth image acquisition portion 52 generates a depth image 62 on the basis of stereo images obtained from the imaging device 12 at different times. Alternatively, the depth image acquisition portion 52 acquires the depth image 62 directly from the imaging device 12 as described above. The depth image 62 is an image showing that the larger the pixel value, the smaller the distance Z in the depth direction, in other words, the cameras are close. However, the main point is not that the data format of the depth image is limited thereto. When the depth image 62 is displayed as an image, the closer a subject is from the cameras, the more luminous it becomes.

In FIG. 7, the difference in image display luminance is represented by ensuring that the larger the pixel value, the lower the density of shading. That is, the depth image 62 contains three subjects 64, 66, and 68 in the field of view. The subjects 64 and 66 are located at similar distances relatively close to the cameras. The subject 68 is located farther from the cameras. Here, the positional relationship between the subjects 64 and 68 corresponds to that between the persons 58 and 59 in FIG. 6.

The matching portion 54 finds the magnification factor M from formula (9) in accordance with the distance Z of each of the subjects 64, 66, and 68 in the depth direction, thus enlarging or reducing the reference template image 60. It should be noted, however, that the reference template image 60 is not enlarged or reduced when the magnification factor M is 1. For example, if a distance $Z_{64}$ of the subject 64 is approximately equal to a distance $Z_{66}$ of the subject 66 ($Z_{64} \approx Z_{66}$) depicted in the figure, and if magnification factors $M_{64}$ and $M_{66}$ calculated therefrom that are approximately equal ($M_{64} \approx M_{66}$) are larger than 1, the reference template image 60 is enlarged by that magnification factor (S30). Then, template matching is performed on the subjects 64 and 66 at that distance using an enlarged template image 70 (S32 and S34).

On the other hand, if the magnification factor $M_{68}$ calculated from a distance $Z_{68}$ of the subject 68 is smaller than 1, the reference template image 60 is reduced by that magnification factor (S36). Then, template matching is performed against the subject 68 at the distance $Z_{68}$ using a reduced template image 72 (S38).

The template matching process is performed as follows. That is, the process of arranging the template image in the depth image and calculating the matching evaluation value is repeated while moving the template image only very slightly at a time. This process is repeated for each subject, thus identifying, as a target, the subject that provides an excellent matching evaluation value equal to or larger than a threshold at one of the positions and determining the position of the template image as the target position. An ordinary technique can be used to calculate a matching evaluation value at each template image position. For example, indices representing the differences in pixel value between the two images may be summed within the template image area and used as a matching evaluation value.

In the present embodiment, the area of the subject silhouette at the distance Z in the depth direction is uniquely associated with the template image used for the subject. As a result, the area over which the template image is moved is more limited than the ordinary technique to which template matching is performed over the entire surface of the shot image. Further, there is no need to repeatedly change the size of the template image and calculate a matching evaluation value at each template image position. In the example depicted in FIG. 7, the subjects 64 and 66 are objects in the same shape but at different sizes. However, matching using the enlarged template image 70 makes it possible to find, from the matching evaluation value, that the subject 64 is the only desired target. As a result, it is possible to efficiently detect the position of the target of the desired shape and size.

Figure 8:
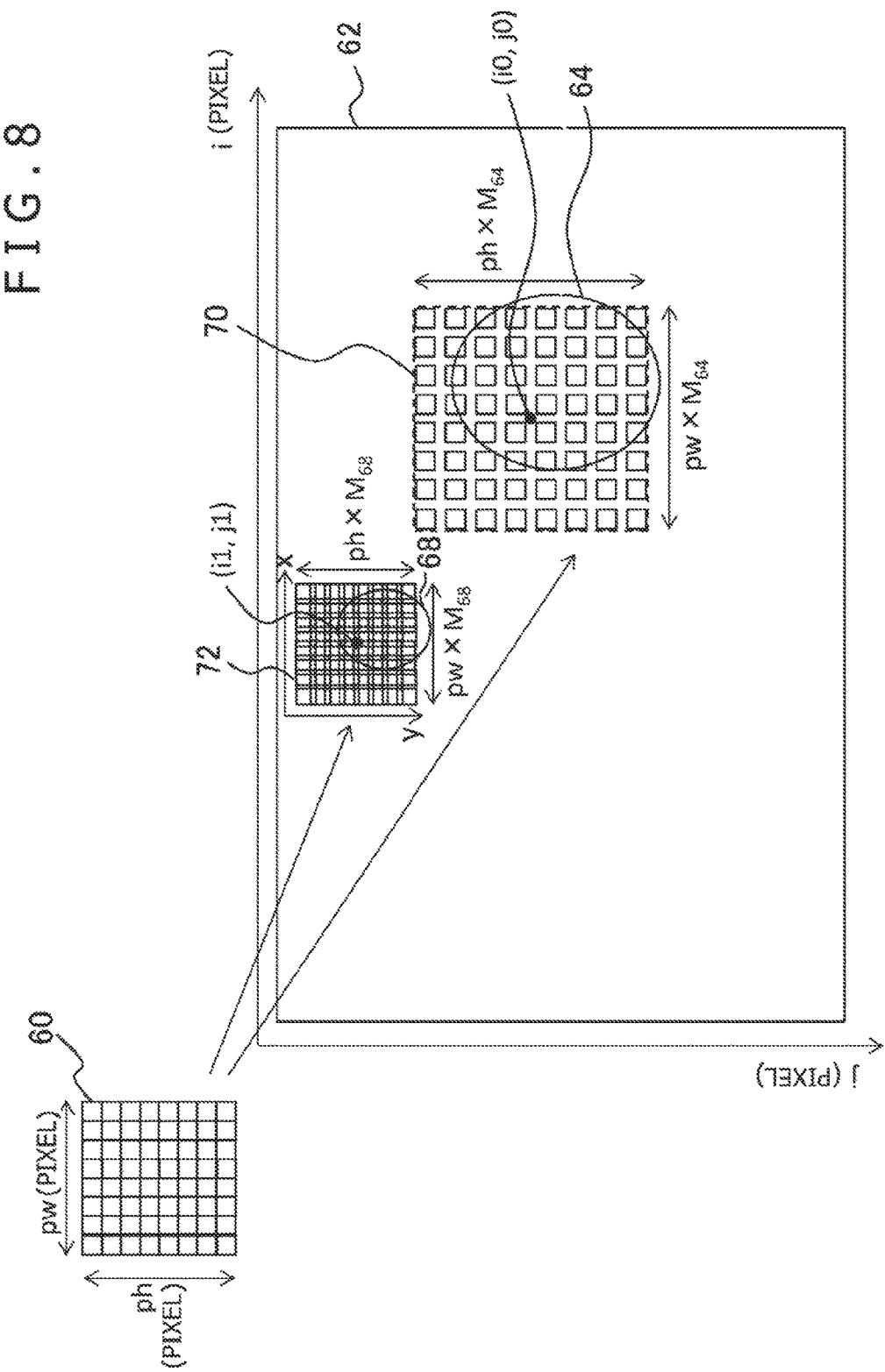
FIG. 8 is a diagram for describing a specific technique for adjusting a size of a reference template image first and then calculating a matching evaluation value in the present embodiment.

FIG. 8 is a diagram for describing a specific technique for adjusting a size of a reference template image first and then calculating a matching evaluation value. The reference template image 60, the size-adjusted template images 70 and 72, and the depth image 62 are similar to those depicted in FIG. 7. Therefore, these images are denoted by the same reference symbols. It should be noted, however, that the reference template image 60 in FIG. 8 is divided into cells of a lattice, with each cell representing one pixel. As for the depth image 62, on the other hand, only the contours of the heads of the subjects 64 and 68 are depicted by solid lines for ease of comprehension.

A horizontal pixel count pw (pixels) and a vertical pixel count ph (pixels) of the reference template image 60 are both 8 (pw=ph=8) in FIG. 8. However, the main point is not that the pixel counts are limited thereto. The matching portion 54 scans the pixels of the depth image 62, for example, in raster order, thus detecting the pixels whose values fall within a given range. Here, the term "given range" refers to a range in which the pixel value is considered valid as a distance of the subject in the depth direction. The upper and lower limits thereof are set in advance. The range may be changed according to the application purpose of position information such as games.

In FIG. 8, one of the pixels detected as described above is represented by pixel coordinates (i1, j1). This pixel is included in the silhouette area of the subject 68. When such a pixel is detected, the template image 72 is arranged so that that pixel is located at the center of the template image 72. It should be noted, however, that the reference template image 60 is reduced by the magnification factor $M_{68}$ ($M_{68}<1$) appropriate to the pixel value of this pixel, i.e., the distance $Z_{68}$ in the depth direction. Therefore, the horizontal width of the template image 72 to be arranged is pw×$M_{68}$ (pixels) in pixels, and the vertical width thereof is ph×$M_{68}$ (pixels) in pixels.

Then, the pixel value of the template image 72 and the pixel value of the depth image 62 are compared at the same position. As illustrated in FIG. 8, the reference template image 60 is reduced relative to the subject 68. As a result, the gap between pixels in the template image 72 becomes smaller than the gap between pixels in the depth image 62. That is, the pixels to be compared may not be in a one-to-one correspondence. In this case, the pixel of the depth image 62 close to the pixel of the template image 72 is basically considered to be "at the same position." As a result, a plurality of pixels of the template image 72 may be compared with one pixel of the depth image 62.

Assuming that the coordinates of each of the pixels of the template image 72 are (x, y), the coordinates (i, j) of the pixel of the depth image 62 considered to be "at the same position" can be found, for example, as follows:

$$i = i1 + (x - pw/2) \times M1 \quad (10)$$

$$j = j1 + (y - ph/2) \times M1 \quad (11)$$

Here, the second term of the right side is changed to an integer by rounding off or dropping the fractional part.

The same is true for matching against the subject 64. That is, if coordinates (i0, j0) of one of the pixels detected by scanning falls within the silhouette area of the subject 64, the pixel value of this pixel is the distance $Z_{64}$ of the subject 64 in the depth direction. Therefore, the magnification factor $M_{64}$ ($M_{64} > 1$) is calculated in accordance therewith. Then, the template image 70, obtained by enlarging the reference template image 60 by the magnification factor $M_{64}$, is arranged so that the pixel is located at the center of the template image 70. Here, the horizontal width of the template image 70 is $pw \times M_{64}$ (pixels), and the vertical width thereof is $ph \times M_{64}$ (pixels).

Then, the pixel value of the template image 70 and the pixel value of the depth image 62 are compared at the same position. In this case, the reference template image 60 has been enlarged. Therefore, the gap between pixels in the template image 70 is larger than the gap between pixels in the depth image 62. However, the pixel of the depth image 62 considered to be at the same position as each of the pixels of the template image 70 can be determined as with formulas (10) and (11).

When the pixel of the template image is associated with the pixel of the depth image as described above, a matching evaluation value is calculated using the two pixel values. The technique for calculating a matching evaluation value is as described above. A matching evaluation value used in ordinary matching can be employed. In the present embodiment, however, a matching evaluation value is calculated as follows. First, when the pixel value of the depth image associated with each pixel of the template image, i.e., the distance Z in the depth direction, is acquired, it is judged whether or not the value falls within a given range from $Z_{68}$ or $Z_{64}$, the pixel value that created a reason for arranging the template image, and in the example of FIG. 8, the pixel at coordinates (i1, j1) or (i0, j0).

The reason for this is that when the pixel value falls within a given range, it is probable that the same subject as that detected at coordinates (i1, j1) or (i0, j0) in the depth image is continuously present up to the pixel in question. For example, when the head position is detected, a target can be considered to be part of the continuous surface of the head so long as the pixel value falls within the range of about 10 cm to 30 cm at the front and back. A specific range is determined according to the actual shape of the target.

Then, a matching evaluation value V is calculated as follows:

$$V = \tfrac{1}{\Sigma} \Sigma_n \times B_n \quad (12)$$

where is $\tfrac{1}{\Sigma}$ the sum of all the pixels of the template image, and $u_n$ takes on the value of "+1" if the pixel value of the depth image associated with the nth pixel of the template image falls within the above given range, and, if not, takes on the value of "−1," and $B_n$ is the pixel value of the nth pixel in the template image, and takes on the value of "1" if the pixel is located inside the shape of the target, and if not, takes on the value of "0."

Such a calculation method ensures that if the distance of an object in the depth direction falls within the given range, and by extension, if the object is integral, and the closer the subject is in shape and size to the template image, the higher the evaluation value V at the template image position. It should be noted that this calculation technique is merely an example. It will be understood by those skilled in the art that the calculation technique can be applied in various ways to match, for example, the image data format.

Figure 9:
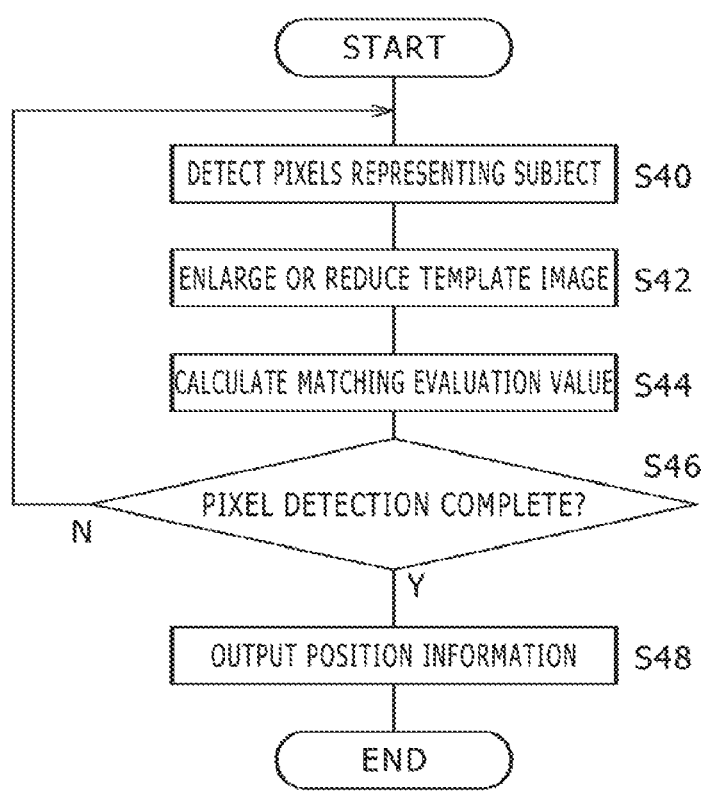
FIG. 9 is a flowchart depicting steps for the matching portion of the information processor to detect a head position in S16 of FIG. 4.

The operation of the matching portion 54 configured as described so far is as follows. FIG. 9 is a flowchart depicting steps for the matching portion 54 of the information processor 10 to detect a head position in S16 of FIG. 4. First, the matching portion 54 scans the pixels of the depth image acquired by the depth image acquisition portion 52, for example, in raster order, thus detecting the pixels whose values fall within a given range, i.e., the pixels representing a valid subject's silhouette (S40).

When the appropriate pixel is detected, the matching portion 54 enlarges or reduces the reference template image by the pixel value, i.e., the magnification factor appropriate to the distance in the depth direction (S42). Then, as depicted in FIG. 8, the matching portion 54 arranges the template image on the depth image so that that pixel is located at the center of the template image, and calculates a matching evaluation value using each pixel and its corresponding pixel of the depth image as depicted in formula 12 (S44). The processes from S40 to S44 are repeated until all the pixels of the depth image are scanned (N in S46). This provides a distribution of matching evaluation values having a matching evaluation value associated with each of the pixels making up the subject's silhouette in the depth image.

The matching portion 54 outputs, as position information, either data representing the above distribution on the image plane, data representing the silhouette area which is likely to be the target based on the data representing the distribution, or the like (Y in S46 and S48). Output position information is used by the coordinate point analysis portion 56, for example, to set a detection area. Further, the output information generation section 50 may narrow down the head area on the basis of the position information first and then perform image analysis processes such as face recognition and tracking appropriate to the application purpose to generate a display image.

Figure 10:
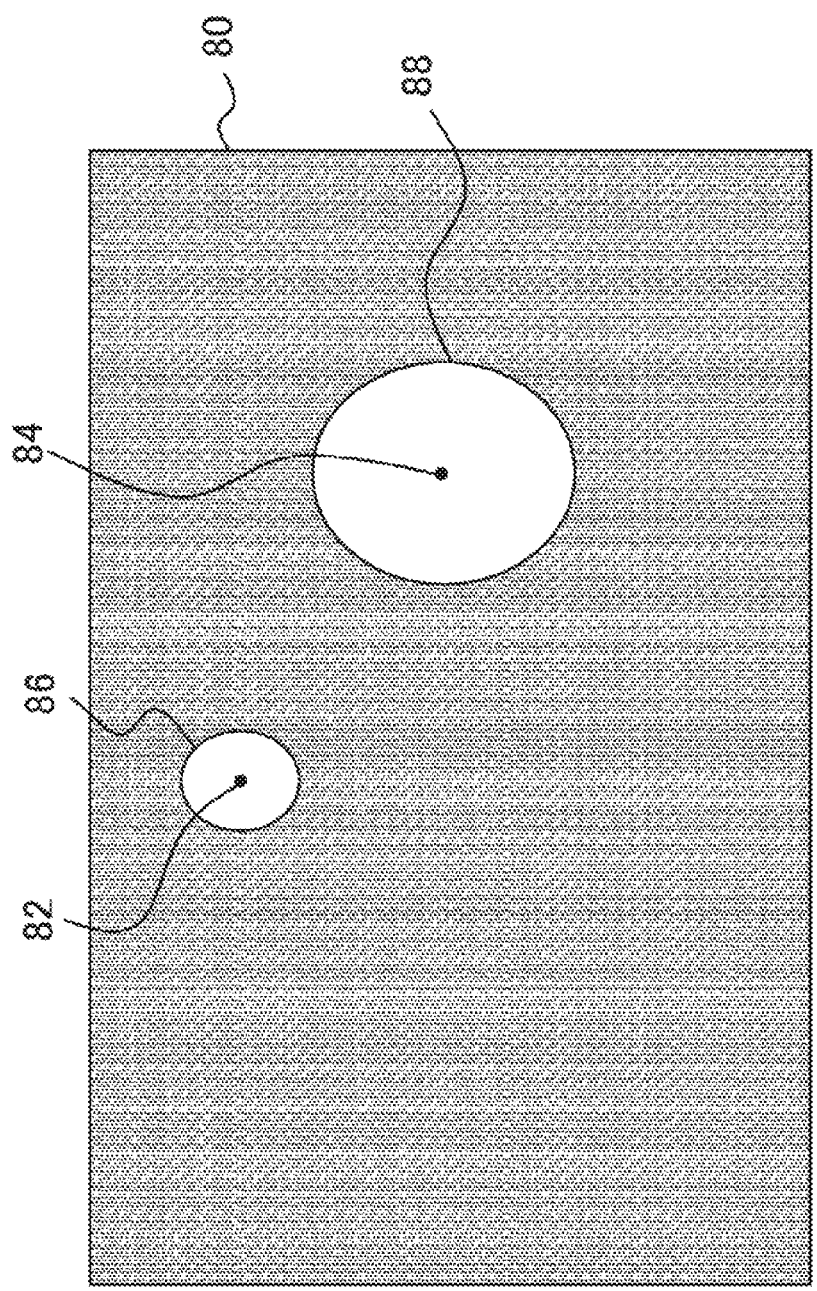
FIG. 10 is a diagram illustrating a data example of position information obtained in the present embodiment.

FIG. 10 illustrates a data example of position information obtained in S48. The matching portion 54 generates a matching evaluation value distribution having a matching evaluation value associated with each of the pixels in the depth image as described above. Then, the matching portion 54 extracts, from the distribution, points 82 and 84 whose matching evaluation values are maximal above a given threshold. Further, a template image is arranged so that each of the maximal points 82 and 84 is located at the center of the template image. These template images are obtained by enlarging or reducing the reference template image by the same magnification factor as used for adjusting the size during matching evaluation with the maximal points 82 and 84 at the center.

Then, the areas of the arranged template images corresponding to the target silhouette are represented in a manner distinguished from other areas. This provides an image 80 representing areas 86 and 88 respectively for the maximal points 82 and 84. The areas 86 and 88 are likely to be the silhouettes of the desired target. The example depicted in FIG. 10 is an image obtained from the depth image 62 depicted in FIG. 7. This image represents the areas likely to be a human head with a pixel value different from that for other area. It should be noted that the resolution of the image 80 output as position information is not specifically limited. However, the gap between pixels of a template image becomes larger as depicted in FIG. 8 when the template image is enlarged. Therefore, the area 88 may be represented by interpolation as appropriate in accordance with the resolution of the image 80.

Figure 11:
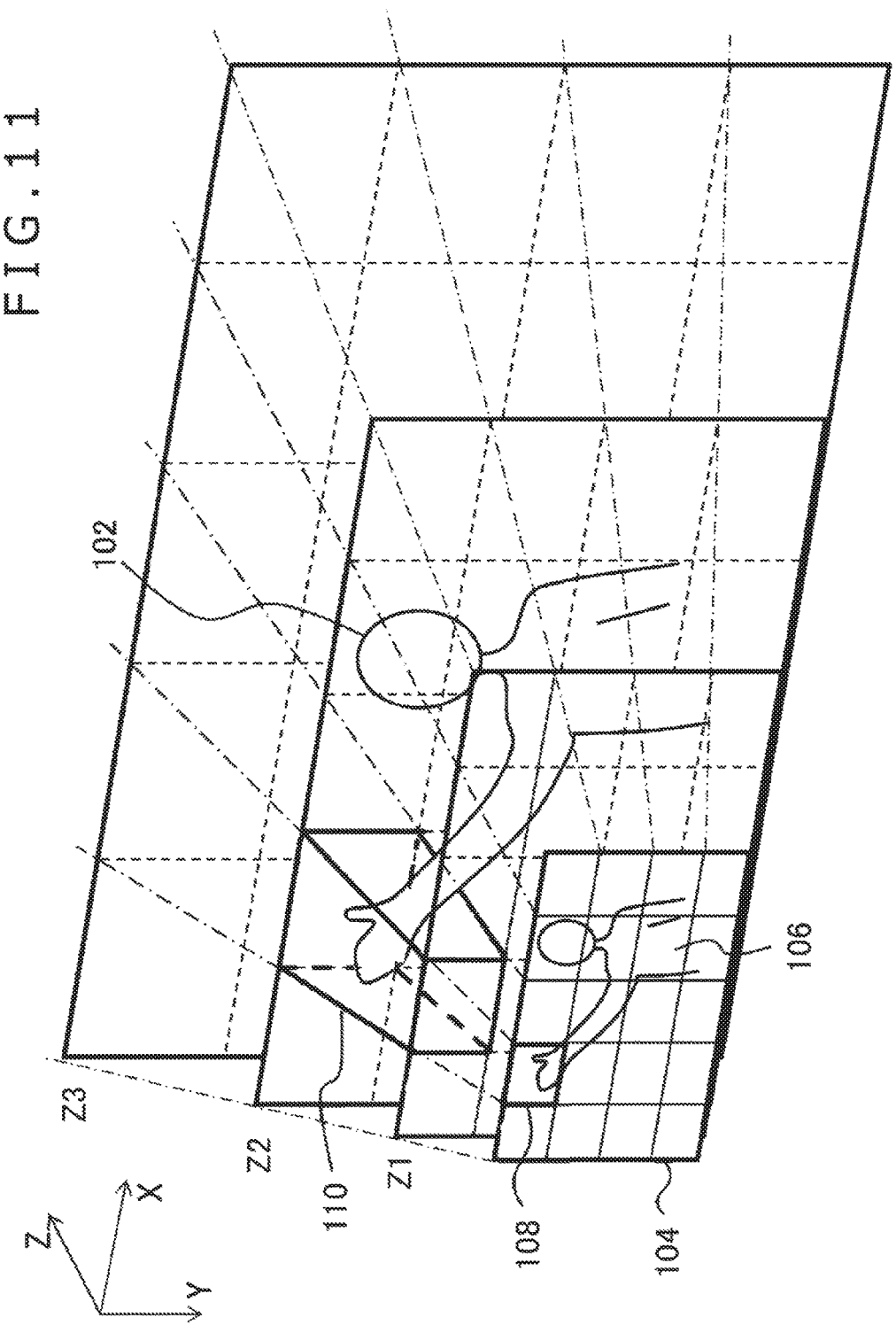
FIG. 11 is a diagram for describing a detection area set in a detection process in the present embodiment.

A description will be given next of the hand detection step in S18 performed by the coordinate point analysis portion 56 in the flowchart depicted in FIG. 4. FIG. 11 is a diagram for describing a detection area set in the detection process. A silhouette 106 appearing in a shot image 104 is obtained by projecting, onto the image plane, a subject 102 that exists in a three-dimensional space (camera coordinate system) having axes depicted at the top left corner of FIG. 11. In the space represented by the shot image 104, the farther the distance in the depth direction, the greater it is. Here, if the three-dimensional space in which the subject 102 exists is divided into distances Z1, Z2, and Z3 in the depth direction, this produces three division planes that run parallel to the shot image 104 as illustrated in FIG. 11.

Further, if the image plane of the shot image 104 is divided vertically and horizontally as illustrated in FIG. 11, these divisions divide the three-dimensional space into truncated pyramids. Here, if the subject 102 exists between the distances Z1 and Z2 in the depth direction, the hand of the subject appearing in an area 108 of the shot image 104 exists in a truncated pyramidal area 110 in the three-dimensional space. The pixel value of the depth image represents the distance of the subject in the depth direction in the image plane of the shot image 104. Therefore, it is possible to judge whether or not the subject's hand exists in the area 110 by comparing three-dimensional information made up of pixel position coordinates and pixel value against that of the area 110.

Thus, if an area obtained by dividing each of the axes of a three-dimensional space that includes an image plane and a depth direction is set as a detection area for comparison against a silhouette in a depth image, it is possible to judge whether or not a target exists in the detection area, and by extension, detect the target position. Most simply, if all truncated pyramidal areas obtained by dividing a three-dimensional space as illustrated in FIG. 11 are used as detection areas, a target can be detected in one of the detection areas irrespective of in which detection area the target exists.

In the present embodiment, on the other hand, the matching portion 54 identifies the head position of the subject 102 as described above, thus making it possible to estimate the neck and shoulder positions. Therefore, if a hand is detected, one or a plurality of detection areas are set only in an area appropriate to the motion range of hands relative to the shoulders. This ensures significantly improved efficiency in detection process and provides reduced probability of objects other than hands being included in the detection areas, eventually contributing to improved detection accuracy. It should be noted that the division planes illustrated in FIG. 11 are merely an example, and that the division planes may vary from one detection area to another. Alternatively, the detection areas may partially overlap. Still alternatively, the coordinate system in which to set detection areas is not limited to the camera coordinate system, and the detection areas may be in various shapes, which will be described later.

Figure 12:
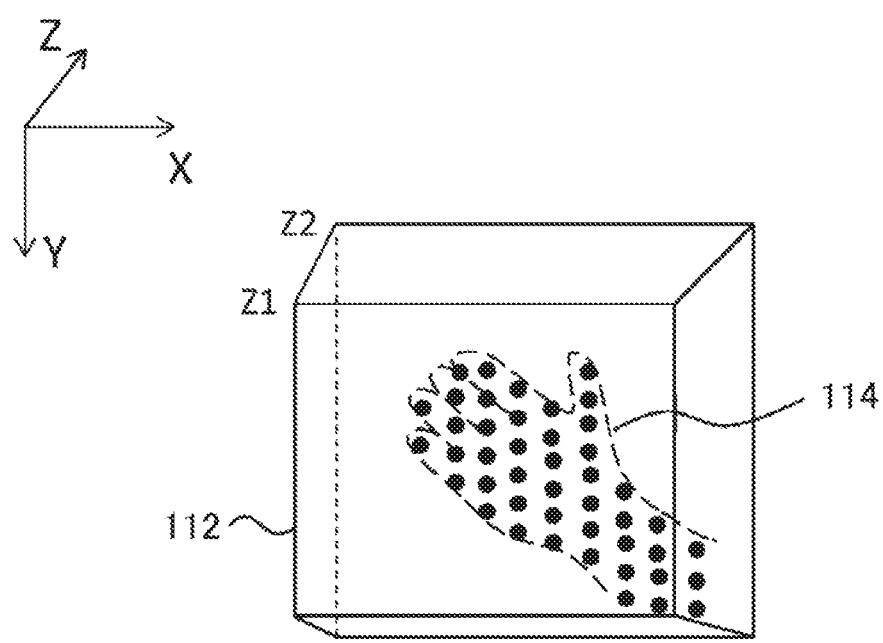
FIG. 12 is a diagram for describing a process for judging whether or not a target exists in the detection area set in the present embodiment.

FIG. 12 is a diagram for describing a process for judging whether or not a target exists in the set detection area. A detection area 112 is in the shape of a truncated pyramid as illustrated in FIG. 11. On the other hand, each pixel of the depth image represents information about position coordinates and a distance in the depth direction in the image plane of the subject, i.e., coordinate points in the three-dimensional space of the camera coordinate system. When the hand of the actual subject enters the detection area 112, the coordinate points represented by the pixels making up a silhouette 114 of the hand in the depth image exist in the detection area 112. In FIG. 12, each pixel is depicted by a black dot.

By finding whether there are coordinate points in the detection area set in the motion range of hand estimated from the head, therefore, it is possible to judge whether or not the hand is located at that position. Practically, the hand's silhouette is represented by a cluster of a given number or more of coordinate points. Therefore, a threshold is set for the number of coordinate points. Then, it is judged that the hand exists in the detection area where there are as many or more coordinate points than the threshold. It should be noted that the spatial resolution used for the judgment may be the same as or different from the resolution of the depth image.

Figure 13:
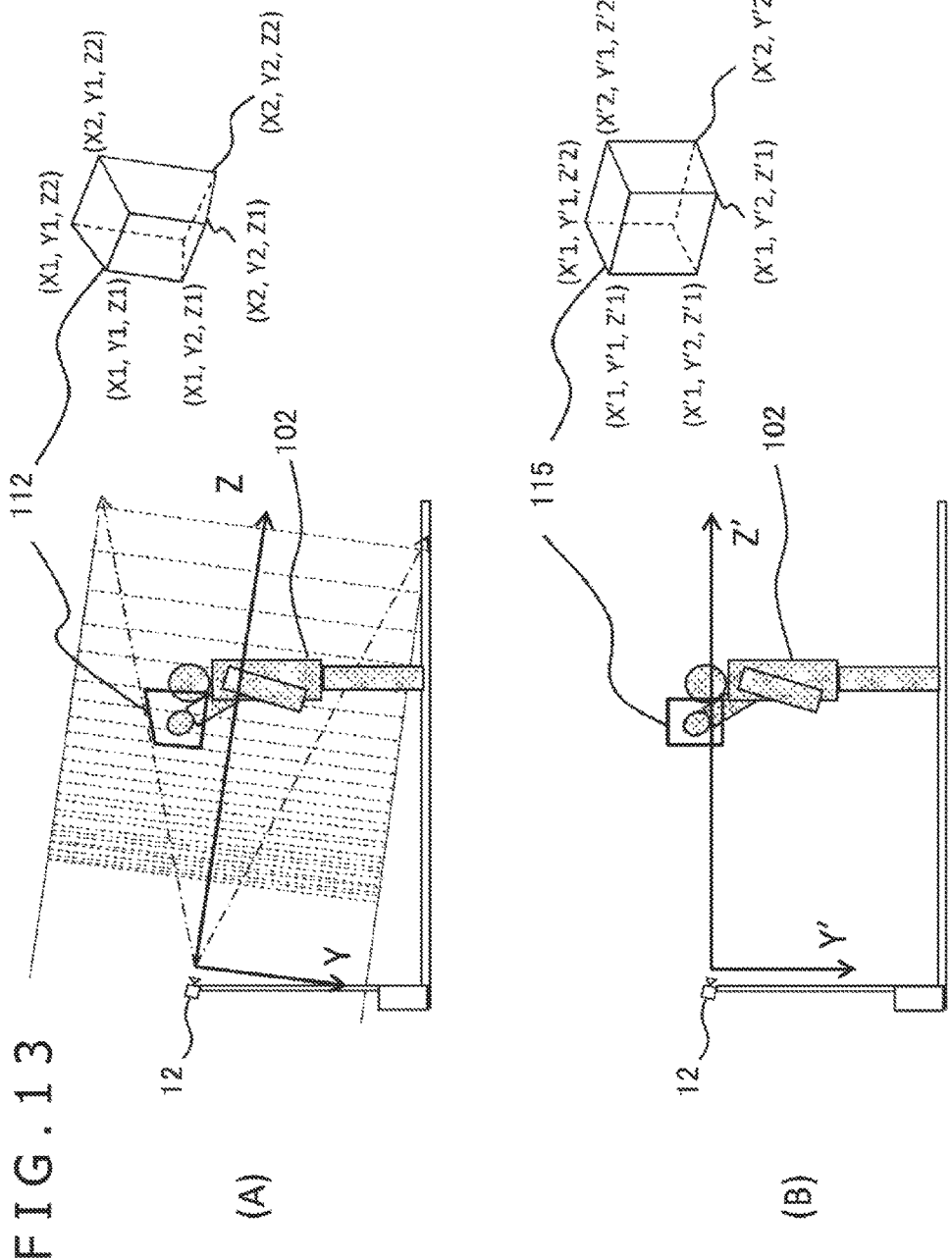
FIG. 13 depicts diagrams illustrating a coordinate system for setting a detection area and a shape of the detection area in the present embodiment.

FIG. 13 depicts diagrams illustrating a coordinate system for setting a detection area and a shape of the detection area. As illustrated in FIG. 11, the shot image is obtained by projecting, onto the image plane, a subject within a viewing volume in the shape of a truncated pyramid. The farther from the imaging device, the broader the area covered by each pixel. Therefore, when an area is set in the camera coordinate system such that $X1 \leq X < X2$, $Y1 \leq Y < Y2$, and $Z1 \leq Z < Z2$ for a coordinate point (X, Y, Z) represented by a pixel of the depth image, the detection area 112 is in the shape of a truncated pyramid as illustrated in FIG. 13A. Further, if the optical axis (Z axis) of the imaging device 12 is tilted relative to the horizontal plane of the real space as depicted in the figure, the vertical direction of the image (Y axis), and by extension, the vertical direction of the detection area, are different from the perpendicular direction of the real space.

On the other hand, the coordinate system in which to set detection areas need not be in the camera coordinate system. For example, if the tilt of the optical axis is identified from a gravitational vector by providing an acceleration sensor on the imaging device 12, for example, a relationship is found between the camera coordinate system and a three-dimensional coordinate system made up of height, width, and depth of the real space, i.e., a world coordinate system. This makes it possible to convert a coordinate point represented by a pixel in the depth image into one in the world coordinate system, and by extension, set a detection area 115 relative to the world coordinate system as illustrated in FIG. 13B. In the example of FIG. 13B, an area is set such that $X'1 \leq X' < X'2$, $Y'1 \leq Y' < Y'2$, and $Z'1 \leq Z' < Z'2$ for a converted coordinate point (X', Y', Z').

In many cases, the vertical axis relative to the ground or floor serves as a reference for a human body. Therefore, in the case of detecting a torso or standing feet in particular, it is probably more advantageous to set a detection area relative to the world coordinate system in terms of processing efficiency and accuracy. It should be noted, however, that, in this case, coordinate conversion is necessary. Therefore, it is preferred to select the coordinate system adaptively in accordance with the target to be detected, anticipated motion, required accuracy, calculation performance, and other factors.

Figure 14:
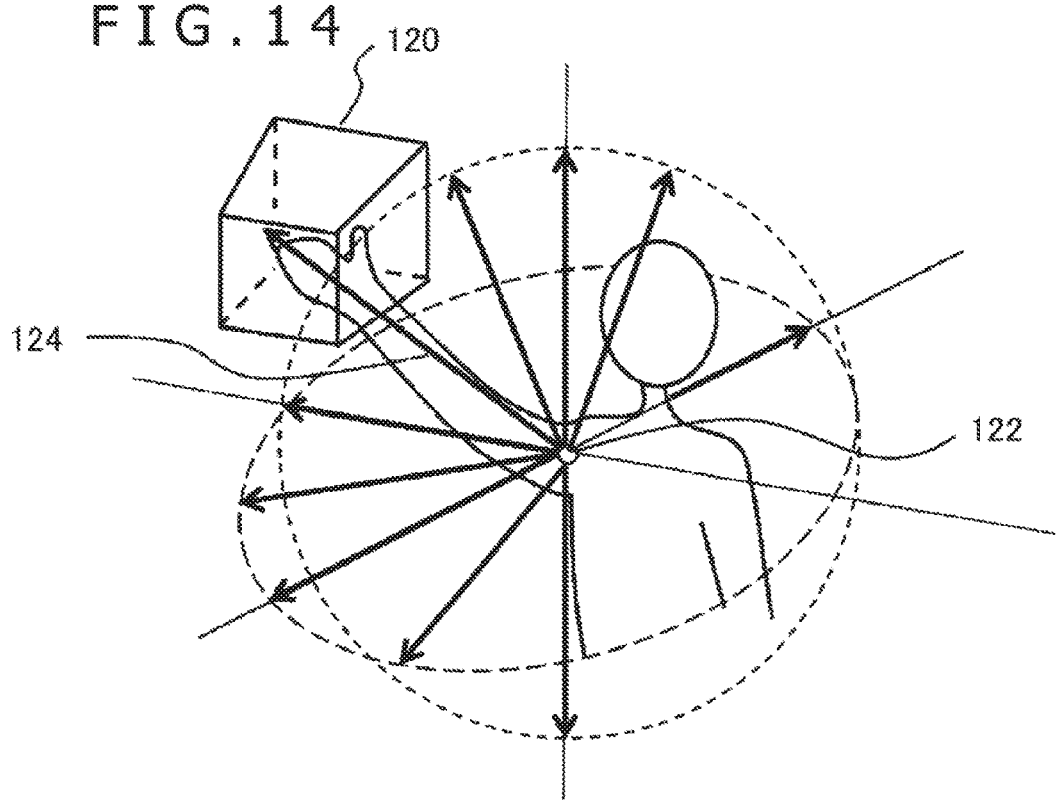
FIG. 14 is a diagram for describing a principle of identifying a hand tip position if the presence of a hand is detected in a certain detection area in the present embodiment.

FIG. 14 is a diagram for describing a principle of identifying a hand tip position if the presence of a hand is detected in a certain detection area 120. As described earlier, a hand moves on a spherical plane centered around a shoulder or elbow. In the case of a motion with the elbow bent at a small angle, for example, the arm moves radially around the shoulder, i.e., the upper arm joint, as illustrated by the arrow in FIG. 14. In this case, letting the shoulder be denoted by a reference point 122, the direction which the hand tip should face can be determined by the position of the detection area 120 relative to the reference point 122. In the case of FIG. 14, the subject raises his or her right hand diagonally rightward. As a result, the hand is detected in the detection area 120 that is located diagonally rightward and upward relative to the reference point 122. It is possible to assume that the hand tip points, at this time, to the direction of the vector (arrow 124) from the reference point 122 to the detection area 120.

That is, of the spherical planes passing through the detection area in which the presence of a hand is detected, the normal vector at the position of the detection area is determined as a reference vector representing the direction which the hand should face. Then, the hand tip position is identified by comparison against coordinate points in the detection area. The shoulder or elbow serves as a reference point to detect the hand tip, the shoulder to detect the elbow, the leg joint or knee to detect the foot tip, and the leg joint to detect the knee. If the knee bends to a large extent, the detection may be performed in a step-by-step manner such as detecting the elbow tip first relative to the shoulder as a reference point, and then detecting, for example, the hand tip relative to the elbow tip. Alternatively, the angle at which the elbow is bent in accordance with the distance from the reference point to the hand tip, followed by switching the reference point between the shoulder and elbow. The same is true for the foot.

Figure 15:
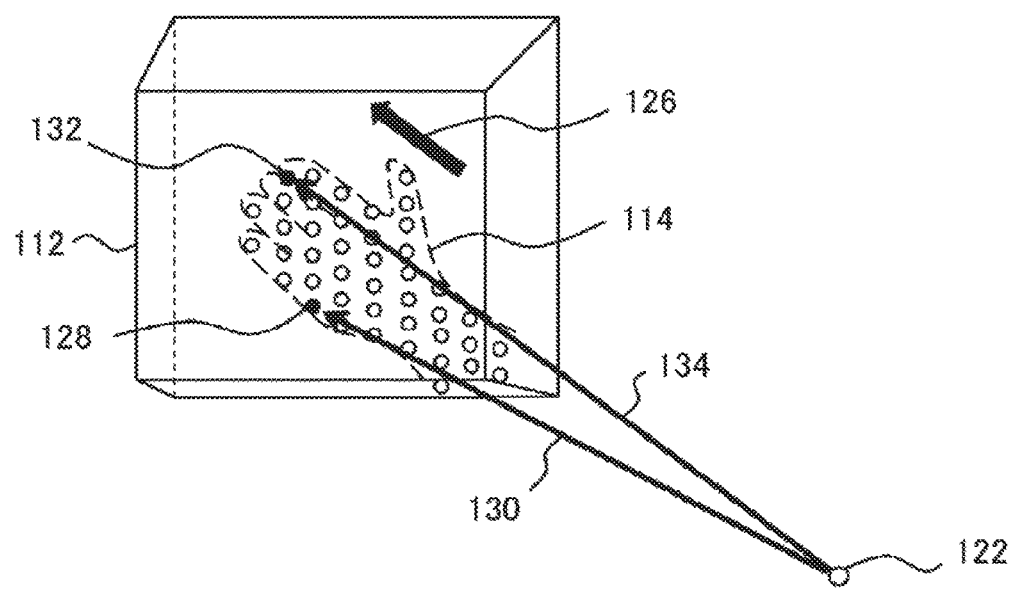
FIG. 15 is a diagram for describing a technique for identifying the hand tip position using a reference vector in the present embodiment.

FIG. 15 is a diagram for describing a technique for identifying the hand tip position using a reference vector. As with FIG. 12, because a hand enter the detection area 112, the coordinate points (white and black dots) representing the pixels that make up the silhouette 114 of the hand exist in the detection area 112. It is probable that, of these coordinate points, the one farthest from the reference point 122 in the direction of a reference vector 126 represents the hand tip position. For this reason, an inner product between two vectors, a coordinate point vector from the reference point 122 to each of the coordinate points, and the reference vector 126, is calculated for comparison between the inner products.

For example, two vectors, a vector 134 to a coordinate point 132 located near the hand tip and a vector 130 to a coordinate point 128 located closer to the wrist, are compared. The vector 134 that has a smaller difference in direction from the reference vector 126 and is longer has a larger inner product. By taking advantage of this characteristic, the inner products are calculated for all the coordinate points in the detection area 112 and sorted in descending order first, and then a given number of top-ranked coordinate points are extracted. As a result, these coordinate points represent an approximate silhouette of the hand tip and its nearby part. Therefore, the average of the position coordinates represented by the extracted coordinate points is taken for use as position coordinates of the hand tip. Using the average of the plurality of coordinate points keeps the influence of noise and error in the coordinate points to a minimum. It should be noted that coordinate conversion is performed as appropriate to ensure that the coordinate system is the same between the coordinate points and the reference point during calculation of the coordinate point vectors.

Figure 16:
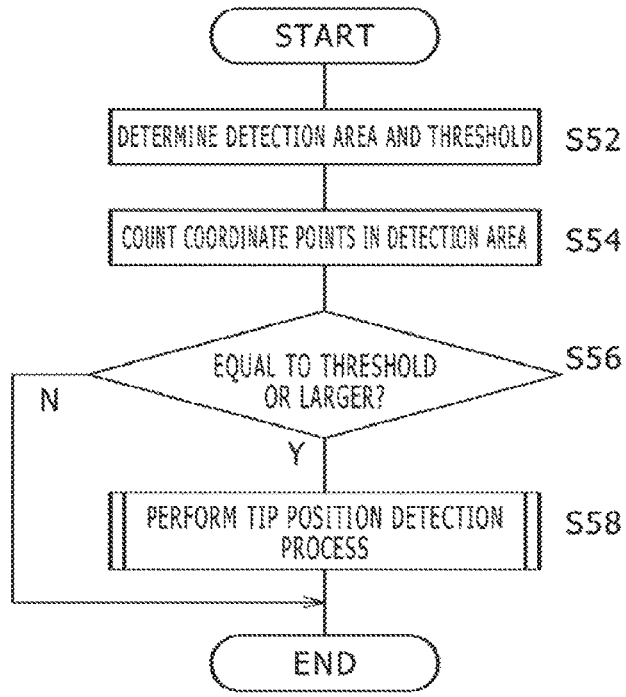
FIG. 16 is a flowchart depicting steps for a coordinate point analysis portion of the information processor to detect a hand position in S18 of FIG. 4.

The operation of the coordinate point analysis portion 56 configured as described so far is as follows. FIG. 16 is a flowchart depicting steps for the coordinate point analysis portion 56 of the information processor 10 to detect the hand position in S18 of FIG. 4. First, the coordinate point analysis portion 56 determines a detection area on the basis of the head position detected by the matching portion 54 and also determines a threshold for the number of coordinate points that is used for judgment as to whether the hand exists in the detection area (S52). In the case of detecting a right hand, for example, the right shoulder position is identified by starting from the silhouette of the head identified in the depth image to the neck, and to the torso, and then a plurality of detection areas are distributed on or inside a spherical plane that has, as a radius, the arm's length around the right shoulder. If the motion is limited due, for example, to game content, bounds within which to distribute detection areas may be limited further.

It should be noted that if the hand has already been detected in an earlier time step thanks to the loop in S22 of FIG. 4, detection areas may be determined around that hand position. Alternatively, the hand position may be predicted from the motion up to that time and reflected in the setting of detection areas. The threshold set for the number of coordinate points to judge the presence may be determined adaptively in accordance with the positions of the detection areas. For example, the farther from the imaging device, the larger the space represented by each coordinate point. In the case of setting detection areas of identical size in the world coordinate system, for example, the farther the detection area from the imaging device, the smaller the threshold. This allows for detection of a hand with comparable accuracy irrespective of the distance from the camera.

Further, the information acquisition accuracy and resolution may vary depending on the shooting environment such as room brightness and shooting conditions. Therefore, the threshold may be changed in accordance with the circumstances at the time such as the shooting environment. Therefore, information may be prepared in advance that shows association between various parameters representing an environment and thresholds. Next, the coordinate point analysis portion 56 counts, of the coordinate points represented by the pixels of the depth image in the three-dimensional space, the number of coordinate points existing in the set detection area (S54).

When the number of coordinate points is equal to the threshold or larger (Y in S56), the coordinate point analysis portion 56 judges that the hand is located at the position of the detection area in question and proceeds with detection of the tip thereof, i.e., the hand tip (S58). If the number of coordinate points is smaller than the threshold, the coordinate point analysis portion 56 judges that the hand is not located at that position, terminating the process (N in S56). If a plurality of detection areas are set in S52, the steps from S54 to S58 are performed for each of the detection areas.

Figure 17:
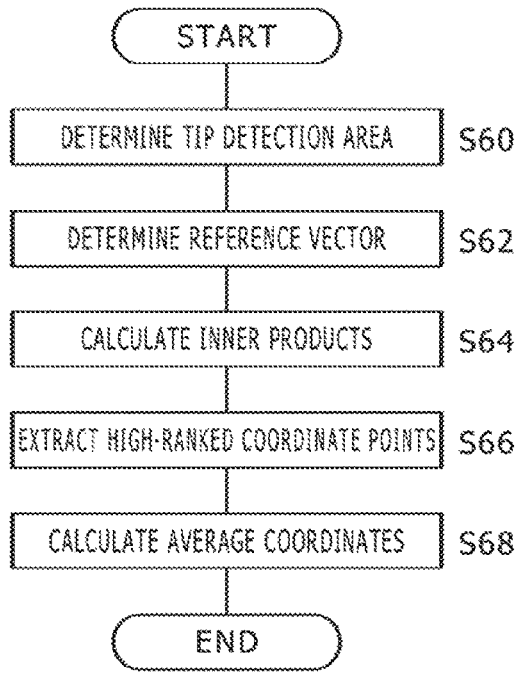
FIG. 17 is a flowchart depicting steps for the coordinate point analysis portion to detect the hand tip position in S58 of FIG. 16.

FIG. 17 is a flowchart depicting steps for the coordinate point analysis portion 56 to detect the hand tip position in S58 of FIG. 16. First, the coordinate point analysis portion 56 determines an area in which the tip is identified (S60). In the description of FIG. 15, the detection area 112 set to detect the presence of a hand is used in an as-is fashion to calculate the inner products of the coordinate points for comparison. On the other hand, a detection area set to detect the presence of a hand may not necessarily be the same as an area that defines a cluster of coordinate points whose inner products are compared to detect a tip. In the description given below, the former may be referred to as a "presence detection area," and the latter a "tip detection area."

Figure 18:
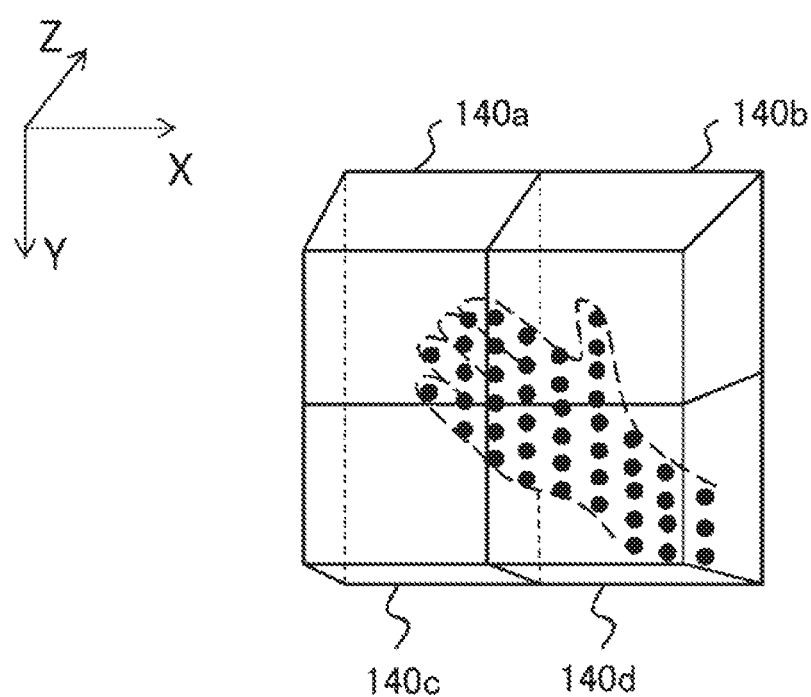
FIG. 18 is a diagram schematically illustrating an example in which a presence detection area for detecting the presence of a hand differs from a tip detection area for detecting a tip position in the present embodiment.

FIG. 18 schematically illustrates an example in which a presence detection area for detecting the presence of a hand differs from a tip detection area for detecting the tip position. In this example, the hand stretches over four presence detection areas 140a, 140b, 140c, and 140d. In this case, a hand tip may be not included in a presence detection area in which the number of coordinate points is equal to the threshold or larger as with the presence detection area 140*d*. Further, there is a likelihood that the number of coordinate points may be equal to the threshold or larger in the plurality of presence detection areas. For this reason, if there are successive clusters of coordinate points in the plurality of adjacent detection areas, a tip detection area is set anew in such a manner as to contain these detection areas. In the example illustrated, it is only necessary to combine the four presence detection areas 140*a*, 140*b*, 140*c*, and 140*d* into a single tip detection area.

Conversely, a presence detection area may be divided such that part thereof is used as a tip detection area. For example, coordinate points may exist in addition to the cluster of coordinate points representing a silhouette of a hand due, for example, to noise or error. In this case, the area including the noise is excluded from the tip detection areas, thus preventing the noise from being erroneously recognized as a tip. In any case, the detection accuracy is enhanced by properly setting, as a tip detection area, an area that contains the entire cluster of coordinate points by which the presence has been detected and further that does not contain unnecessary coordinate points far from the cluster.

For example, a tip detection area of a proper size may be determined on the basis of change in number of coordinate points by acquiring the number of coordinate points while at the same time finely adjusting the size of the detection area. Alternatively, if the tip position is located near the edge as with the presence detection area 140*d*, the presence detection areas 140*a*, 140*b*, and 140*c* adjacent to the presence detection area 140*d* may be included in a tip detection area.

Referring back to FIG. 17, next, the coordinate point analysis portion 56 determines a reference vector for the set tip detection area as described in FIG. 14 (S62), and calculates the inner product between each coordinate point vector and the reference vector (S64). Next, the coordinate point analysis portion 56 sorts the coordinate points in descending order of inner products first and extracts a given number of top-ranked coordinate points (S66). Then, the coordinate point analysis portion 56 calculates the average of the position coordinates represented by the coordinate points for use as a hand tip position (S68).

Figure 19:
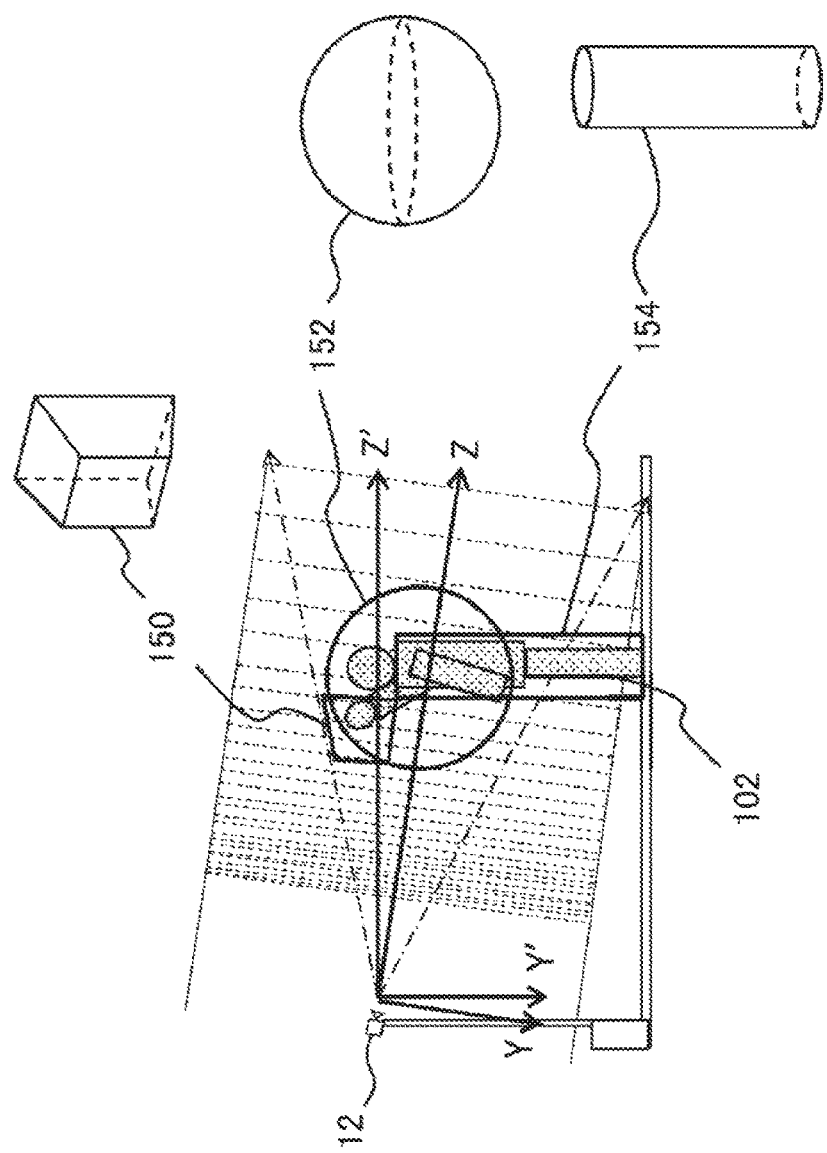
FIG. 19 is a diagram schematically illustrating an example in which detection areas are set that have a plurality of shapes in a plurality of coordinate systems in the present embodiment.

In S52 of FIG. 16 or S60 of FIG. 17, presence and tip detection areas may be set for both the camera and world coordinate systems. Further, these detection areas may be in the shape of not only a truncated pyramid or rectangular parallelepiped obtained by dividing coordinate axes of each coordinate system but also in an arbitrary three-dimensional shape appropriate to the shape of the target to be detected and its motion range. FIG. 19 schematically illustrates an example in which detection areas are set that have a plurality of shapes in a plurality of coordinate systems. In FIG. 19, a detection area 150 is in the shape of a truncated pyramid that is set for the camera coordinate system. Detection areas 152 and 154 are set for the world coordinate system, and the former is spherical, and the latter circularly cylindrical in shape.

For example, a person standing upright is close to a circular or rectangular cylinder whose axis runs vertically. Therefore, using such a detection area makes it easy to eliminate adverse impact of other portions and surrounding environment during presence and tip detection. Further, it is possible to cover the entire motion range of arm during detection of the entire arm by setting detection areas around the shoulder in a circular manner. Thus, the shape of detection areas should be selected properly from among truncated pyramid, rectangular parallelepiped, sphere, ellipsoid, cylinder, cone, and other shapes in accordance with the target whose presence or tip is to be detected, the application purpose of detection results, and other factors.

Figure 20:
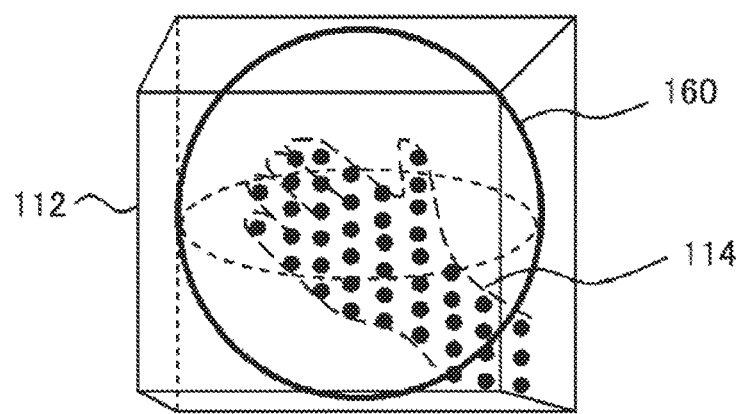
FIG. 20 is a diagram schematically illustrating an example of a mode for setting detection areas having different shapes such that they overlap for step-by-step detection in the present embodiment.

Detection areas of different shapes may be set simultaneously in a plurality of areas such that the presence or tip of a target is detected in each of the detection areas. Alternatively, the presence or tip of a target may be detected first in a detection area of a given shape, after which a detection area of a different shape is set such that the two detection areas partially overlap to detect the presence or tip again, thus ensuring improved detection efficiency and accuracy. FIG. 20 schematically illustrates an example of a mode for setting detection areas having different shapes such that they overlap for step-by-step detection. In this example, the presence of the hand 114 is detected first by the detection area 112 in the shape of a truncated pyramid. The detection area 112 is set relative to the camera coordinate system.

When the number of coordinate points existing in the detection area 112 is equal to the threshold or larger, a spherical detection area 160 is set, for example, that inscribes the truncated pyramid, and then the number of coordinate points existing in the spherical detection area 160 is compared against the threshold. The threshold for the truncated pyramid may be the same as or different from the threshold for the sphere. When the number of coordinate points existing in the spherical detection area 160 is equal to the threshold or larger, a final judgment is made that the hand exists at that position. Alternatively, the tip is detected on the basis of the coordinate points in the spherical detection area 160 in question.

Thus, the many detection areas 112 in the shape of a truncated pyramid are set that do not require coordinate conversion with only modest computational load to roughly identify the area where the hand is highly likely to exist. Then, the spherical detection area 160 whose shape is close to the hand's shape and motion range is set only in the identified area, followed by presence and tip detection with high accuracy, thus providing high processing efficiency and high detection accuracy at the same time. It should be noted that although FIG. 20 depicts a truncated pyramid and a sphere that inscribes the truncated pyramid, the combination of shapes of the detection areas and the positional relationship therebetween may be selected as appropriate in accordance with the shape of the target to be detected, the motion characteristics thereof, and other factors.

Figure 21:
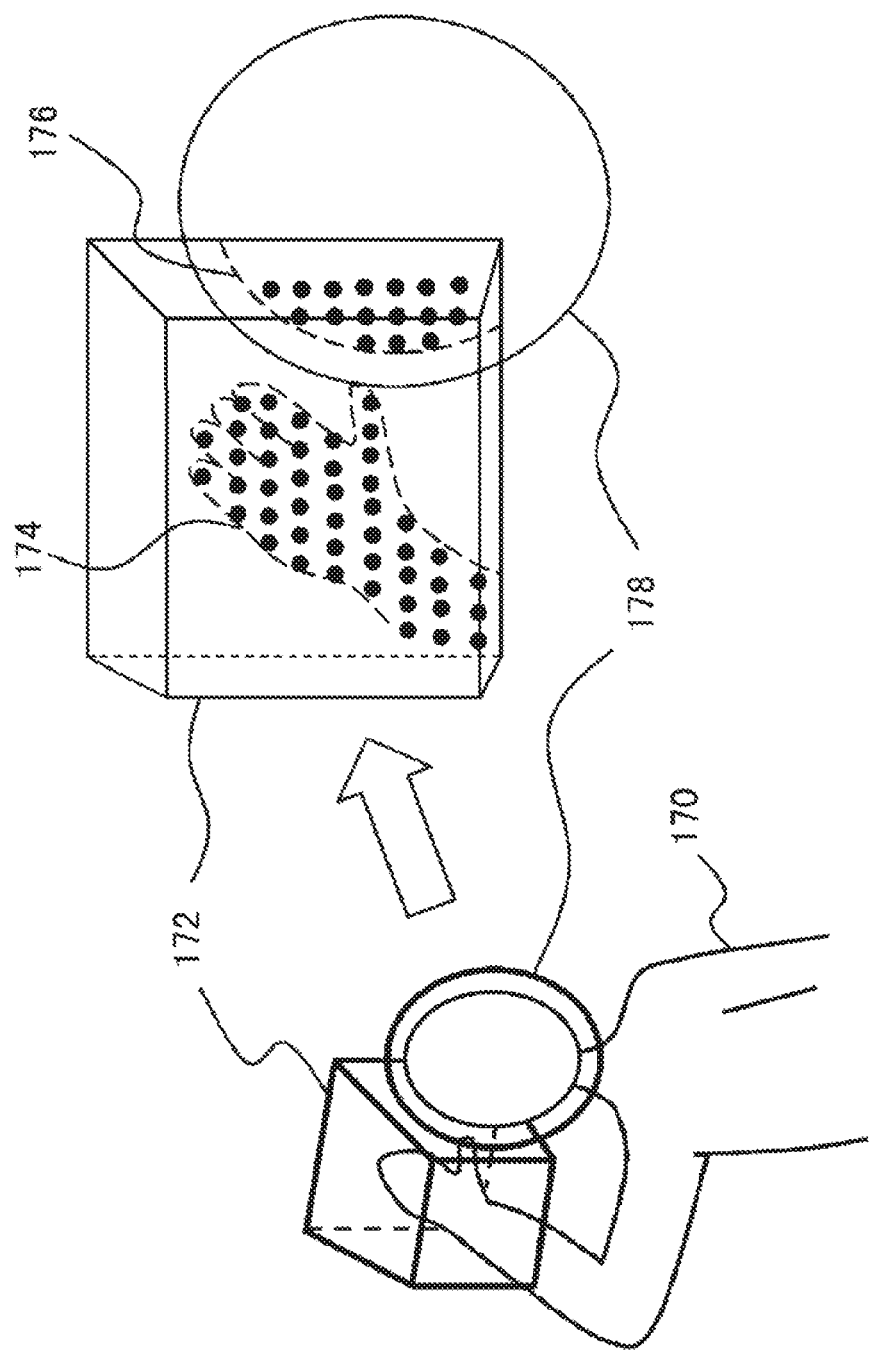
FIG. 21 is a diagram for describing a mode for setting a dead area together with a detection area in the present embodiment.

In the description given so far, detection areas are set to detect the presence or a tip portion on the basis of coordinate points existing in the detection areas. By applying this, an area may be set as a dead area to exclude coordinate points existing in this area from those subject to processing. FIG. 21 is a diagram for describing a mode for setting a dead area together with a detection area. As illustrated in FIG. 21, in the case of detecting a hand of a user 170 including the likelihood of the hand being located close to his or her head, a detection area 172 for that purpose may include a head's silhouette.

As a result, because the detection area 172 includes coordinate points that represent a head's silhouette 176 as illustrated in a manner enlarged at right in FIG. 21, there is a likelihood that even if the hand does not exist at that position, the presence thereof may be erroneously detected so long as the number of coordinate points is equal to the threshold or larger. Further, there is also a likelihood that even if coordinate points that represent a hand's silhouette 174 actually exist as illustrated in FIG. 21, error may occur in the detection of the tip due to the coordinate points that represent the head's silhouette 176.

For this reason, a dead area 178 is set in an area within a given range including the head's silhouette, thus excluding the coordinate points included therein from those target to be detected. In this case, the dead area 178 is set, for example, in the form of an ellipse having its center at the center of the head detected by the matching portion 54. A dead area may be set not only for the head but also for parts other than the target to be detected such as trunk and legs. In order to set such an area, not only detection results of the matching portion 54 but also those obtained by the coordinate point analysis portion 56 by itself in a previous time step may be used. In any case, the shape of a dead area may be selected as appropriate in accordance with the shape of the bodily part as is done for detection areas. This keeps detection error to a minimum, for example, even if many detection areas are set to spread over a large area, or if the part of the target to be detected is highly likely to approach other parts.

A dead area may be set not only for the parts of the same subject but also for surrounding objects included in the camera's field of view. FIG. 22 schematically illustrates an example in which a dead area is set for a floor. In the case of detecting a foot tip of a user 182, detection areas 180*a*, 180*b*, and 180*c*, areas in the motion range of the instep, are, for example, set. Here, there is a likelihood that, even when the foot does not exist, the presence of a foot may be detected in detection areas for detecting the foot touching the floor because a floor's silhouette is always included, which is the case with the detection area 180*c*. Further, even if the foot is touching the ground, the foot cannot be distinguished from the floor, making it impossible to detect the foot tip.

Figure 23:
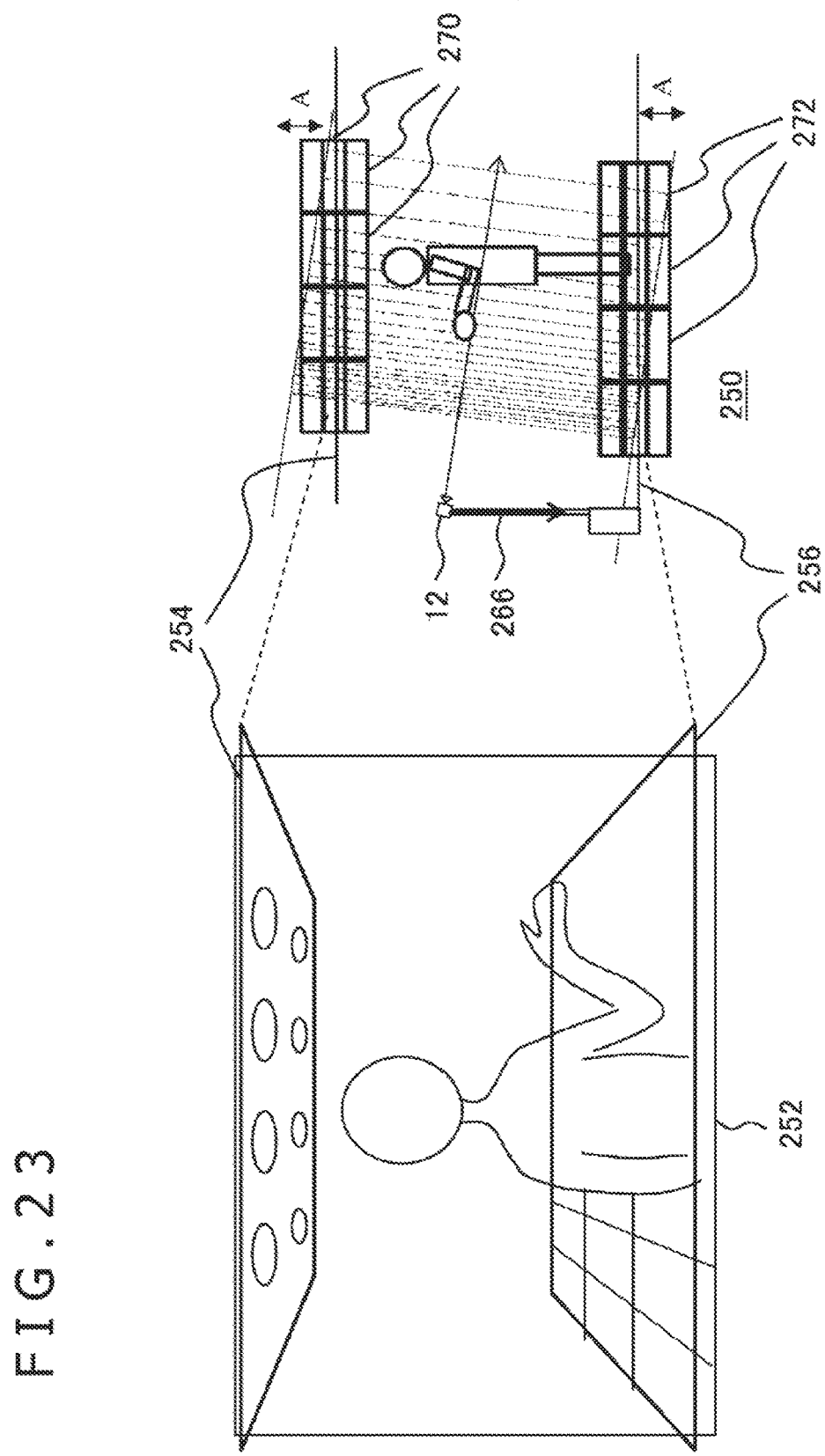
FIG. 23 is a diagram for describing a technique for detecting a ceiling surface or a floor surface in the present embodiment.

For this reason, a dead area 180 is set for an area at and below the floor surface, thus allowing for detection of presence of the foot or of its tip with high accuracy. In this case, the matching portion 54 or the coordinate point analysis portion 56 detects in advance the floor surface position, for example, when the shooting with the imaging device 12 begins. FIG. 23 is a diagram for describing a technique for detecting a ceiling surface or floor surface in such a mode. Shown at right in FIG. 23 is a schematic diagram 250 that illustrates a shooting environment from side, and shown at left is a schematic diagram of an image 252 shot in the shooting environment.

In such a shooting environment, if the imaging device 12 includes an acceleration sensor, planes of a ceiling surface 254 and a floor surface 256 for a plane of a shot image, i.e., horizontal planes in the world coordinate system, are found on the basis of a gravitational vector 266. It is only necessary in principle to identify the height thereof. Therefore, for example, detection areas 270 and 272 for detecting the presence of the ceiling and floor surfaces 254 and 256 are set such that they spread over the entire horizontal planes in the world coordinate system and are stacked vertically one on top of the other as illustrated. Although, in FIG. 23, we assume that the detection areas 270 and 272, each depicted as a rectangle, are in the form of a rectangular flat plate, these areas may be in other shape.

Then, the heights of the floor and ceiling surfaces are identified on the basis of the number of coordinate points in the detection areas. Most simply, the coordinate points existing in the detection areas at each height (layer) are summed, and the height that provides the largest number of coordinate points is considered the height of the floor or ceiling surface. Alternatively further, the angle of the horizontal plane in the world coordinate system estimated from the gravitational vector 266 may be adjusted in consideration of possible error between the estimated horizontal plane and the actual one. FIG. 24 is a diagram for describing a technique for adjusting an angle of a detection area to properly detect a horizontal plane. Depicted at left in FIG. 24 is a case in which there is a difference in angle between the estimated horizontal plane and the actual floor surface 256.

In this case, the detection area that provides the largest number of coordinate points of all the detection areas, or the detection area that provides the outstanding number of coordinate points of all the detection areas, upper and lower ones combined, is extracted first, thus assuming that at least the floor exists at that position. In FIG. 24, a detection area 280 is extracted. Then, the number of coordinate points in each of the detection areas set at the same height as the detection area 280 is counted while at the same time finely adjusting the angle of the estimated horizontal plane, for example, around the gravitational center of the extracted detection area 280. When there are a comparable number of coordinate points in all its detection areas, a detection area 272*b* represents the actual floor surface. Then, it is only necessary to use the detection area 272*b* as a dead area for detecting a foot tip during actual operation.

Described above is a technique for the coordinate point analysis portion 56 to detect a floor or ceiling surface using coordinate points in detection areas. However, the matching portion 54 may detect a floor or ceiling surface through matching. In this case, left and right stereo images are matched. More specifically, a detection plane is set for a horizontal surface estimated in the world coordinate system. Here, the term "detection plane" refers to a plane set in a three-dimensional space to judge whether or not a subject exists in that plane.

Then, the area in which the detection plane is projected onto the image plane is cut out from the left and right shot images making up stereo images. At this time, the cut-out area in either the left or right shot image is moved to the left or right by as much as the parallax from the cut-out area in the other image. In the case of a floor or ceiling surface, planes are distributed longitudinally in the world coordinate system. Therefore, the more forward the pixel line is, the more it is necessary to move it. The extent to which the pixel lines are to be moved is found by formula (2).

The two images cut out as described above are matched on the basis of feature points or the like. Among feature points extracted at this time are lighting equipment on the ceiling, checkered pattern formed by joints of building materials such as tiles, and carpet pattern. When the floor or ceiling surface agrees with the set detection plane, the images cut out from the stereo images in consideration of the parallax are, in principle, completely identical. On the other hand, the more displaced the floor or ceiling surface from the detection plane, the greater the difference between the two images. Therefore, of the detection planes set at a plurality of heights and angles, the one that provides the largest sum of the matching evaluation values of the cut-out images can be identified as a floor or ceiling surface.

When detection planes are used as described above, matching may be performed in two steps, first by distributing a plurality of parallel detection planes in the direction of height, and second by adjusting, primarily, the angles of the portions with high evaluation values of the detection planes with high total evaluation values. Irrespective of whether detection areas or planes are used, fine adjustment suffices as far as angles are concerned so long as an acceleration sensor is provided on the imaging device 12 to acquire a gravitational vector. It should be noted, however, that the adjustment of the estimated horizontal plane as described above ensures accuracy in detection of a floor or other surface even when no acceleration sensor is available.

It should be noted that although the dead area 180 is set to detect the foot tip for an area at and below the floor surface in the mode depicted in FIG. 22, an area at and above the ceiling surface detected as described above is used as a dead area to detect a target near the ceiling. A dead area may be set for a wall surface by applying the same technique to vertical planes and detecting the wall surface. In addition to the above, a dead area may be set for a human body other than the user to be detected or the hand or foot opposite to that to be detected. The human body other than the target individual can be detected based, for example, on face recognition on a detected head position or an internal area of the head. The opposite hand or foot of the same individual can be distinguished on the basis of the motion range from the hand or foot tip for a very short period of time detected in a previous time step. Further, an area with no change in coordinate points for a given period of time may be extracted, for example, as a silhouette of an object such as furniture, followed by setting of a dead area for the extracted area.

Setting a dead area as occasion demands as described above keeps adverse impact of the detection area size on the detection accuracy to a minimum even when the target to be detected approaches other object as when the hand touches the body, face, or furniture. That is, if detection areas are set at a size large enough to permit discrimination of the tip shape with minimal noise, adverse impact of other object can be minimized even if such an object finds its way into the detection area with more ease. As a result, regardless of situations, it is possible to detect presence and tip by paying attention only to the target, with high accuracy and high sensitivity. This permits detection of not only large motions of hands, arms, and other objects but also fine motions of hand tips, allowing for a variety of information processing tasks to be performed in response to such motions.

In the embodiment described above, detection areas are set for necessary parts such as hands and feet on the basis of the position of a reference part such as head detected through template matching. Then, the presence of the target part is detected on the basis of the number of coordinate points included in the detection areas of all the coordinate points when three-dimensional coordinates of each pixel of a depth image are represented in a three-dimensional space. This provides a detection technology that imposes lower processing load than when a detection process of some kind is performed on the entire space and more resistance to other objects and noise.

Further, once the presence is detected as described above, a reference point that takes into account human motion such as shoulder or elbow is set in the case of a hand, and leg joint or knee in the case of a foot, thus identifying a reference vector that represents the direction which the target part should face in accordance with the position to the detection area relative to the reference point. Then, inner products, each between a vector from the reference point to a coordinate point in the detection area and the reference vector, are compared, thus extracting the coordinate point that represents the tip of the target part and identifying the position based on the extracted coordinate points. This permits detection of a tip with high accuracy by taking advantage of a human motion as a constraint irrespective of the direction to which the target part points. Once the tip position is known, it is possible to identify the condition and posture of the human body as a whole from the depth or shot image, thus making the present invention applicable to a variety of purposes such as games.

The shape of presence and tip detection areas can be set at will in accordance with the purpose of use, the shape and motion of the target part, and other factors. This permits highly accurate detection with minimal processing load regardless of the condition of use. Setting a dead area together with detection areas contributes to accurate detection of only the target part without increasing the processing load. As a result, it is possible to provide a human-motion-based user interface that offers high accuracy and highly responsive display images in games and AR. Further, if detection results are fed back to the shooting condition of the imaging device 12, a shot image is acquired with exposure placed on essential parts such as face, hands, and feet. This contributes to further improved accuracy in subsequent processes irrespective of the shooting environment such as room brightness.

The present invention has been described above based on the embodiment. It should be understood by those skilled in the art that the above embodiment is illustrative, that the combination of components and processes can be modified in various ways, and that such modification examples also fall within the scope of the present invention.

REFERENCE SIGNS LIST

2 Information processing system, 10 Information processor, 12 Imaging device, 16 Display device, 13a First camera, 13b Second camera, 22 CPU, 24 GPU, 26 Main memory, 42 Image acquisition section, 44 Input information acquisition section, 46 Position information generation section, 48 Image storage section, 50 Output information generation section, 52 Depth image acquisition portion, 54 Matching portion, 56 Coordinate point analysis portion.

INDUSTRIAL APPLICABILITY

As described above, the present invention is applicable to computers, game consoles, information terminals, image processors, image display devices, and other information processors.

The invention claimed is:

1. An information processor for detecting a position of a given target of a subject in a three-dimensional space shot with a camera, the information processor comprising:
   a depth image acquisition portion adapted to acquire a depth image representing, on an image plane, a distance of the subject from the camera in a depth direction as a pixel value; and
   a coordinate point analysis portion adapted to identify a tip position of the target and generate and output position information thereof by performing a given calculation on each of coordinate points included in a detection area set in the three-dimensional space and comparing these coordinate points if a given number or more of coordinate points representing pixels of the depth image in the three-dimensional space are included in the detection area,
   wherein the coordinate point analysis portion determines a reference vector representing a direction which the target should face when the target exists in the detection area on the basis of a relative position of the detection area relative to a given reference point in a three-dimensional space and a motion characteristic of the target relative to the reference point and identifies the tip position of the target in a direction of the reference vector by calculating and comparing inner products, each between a coordinate point vector from the reference point to one of the coordinate points included in the detection area and the reference vector.

2. The information processor of claim 1, further comprising: a reference part detection section adapted to detect, in a three-dimensional space, a position of another part serving as a reference for motion range of a target to be detected, wherein the coordinate point analysis portion identifies a position of the reference point on the basis of a position of the other part, determines the reference vector on the basis of the position of the reference point, and calculates inner products between the coordinate point vectors and the reference vector.

3. The information processor of claim 1, wherein after identifying a tip position of the target, the coordinate point analysis portion further identifies a tip of another target using the tip position of the target as a reference point.

4. The information processor of claim 1, further comprising:
a reference part detection section adapted to detect, in a three-dimensional space, another part serving as a reference for motion range of a target to be detected,
wherein the coordinate point analysis portion determines bounds within which to set detection areas on the basis of the motion range identified based on the position of the other part.

5. The information processor of claim 1, wherein
the depth image acquisition portion acquires the depth image for an image frame of a movie shot with a camera, and
the coordinate point analysis portion determines the bounds within which to set the detection areas on the basis of the position of the target detected in a previous time step.

6. The information processor of claim 1, wherein the coordinate point analysis portion includes, as coordinate points to be compared against, those coordinate points existing in areas adjacent to the detection area that includes the given number or more of coordinate points.

7. The information processor of claim 1, wherein the coordinate point analysis portion further sets, in the three-dimensional space, a dead area that defines bounds within which the coordinate points, included in the detection area, are not subject to processing.

8. The information processor of claim 1, wherein the coordinate point analysis portion changes a shape of the detection area on the basis of at least either a shape or motion characteristic of the target.

9. An information processing method for an information processor to detect a position of a given target of a subject in a three-dimensional space shot with a camera, the information processing method comprising:

acquiring a depth image representing, on an image plane, a distance of the subject from the camera in a depth direction as a pixel value and storing the depth image in a memory; and
identifying a tip position of the target and generating and outputting position information thereof by performing a given calculation on each of coordinate points included in a detection area set in the three-dimensional space and comparing these coordinate points if a given number or more of coordinate points representing pixels of the depth image read from the memory are included in the detection area,
wherein the identifying and generating includes determining a reference vector representing a direction which the target should face when the target exists in the detection area on the basis of a relative position of the detection area relative to a given reference point in a three-dimensional space and a motion characteristic of the target relative to the reference point and identifies the tip position of the target in a direction of the reference vector by calculating and comparing inner products, each between a coordinate point vector from the reference point to one of the coordinate points included in the detection area and the reference vector.

10. A non-transitory, computer-readable storage medium containing a computer program, which when executed by a computer, causes the computer to perform actions in connection with detecting a position of a given target of a subject in a three-dimensional space shot with a camera, the actions, comprising:
acquiring a depth image representing, on an image plane, a distance of the subject from the camera in a depth direction as a pixel value; and
identifying a tip position of the target and generating and outputting position information thereof by performing a given calculation on each of coordinate points included in a detection area set in the three-dimensional space and comparing these coordinate points if a given number or more of coordinate points representing pixels of the depth image in the three-dimensional space are included in the detection area,
wherein the identifying and generating includes determining a reference vector representing a direction which the target should face when the target exists in the detection area on the basis of a relative position of the detection area relative to a given reference point in a three-dimensional space and a motion characteristic of the target relative to the reference point and identifies the tip position of the target in a direction of the reference vector by calculating and comparing inner products, each between a coordinate point vector from the reference point to one of the coordinate points included in the detection area and the reference vector.

* * * * *